(12) United States Patent
Landis et al.

(10) Patent No.: US 12,254,235 B2
(45) Date of Patent: Mar. 18, 2025

(54) REMOTE SENSING SYSTEM AND METHOD FOR ARTICLE OF PERSONAL PROTECTIVE EQUIPMENT

(71) Applicant: 3M INNOVATIVE PROPERTIES COMPANY, St. Paul, MN (US)

(72) Inventors: Jeffrey L. Landis, Charlotte, NC (US); Jason M. Patterson, Monroe, NC (US); Darin K. Thompson, Huntersville, NC (US); Eric J. Bassani, Denver, NC (US)

(73) Assignee: 3M Innovative Properties Company, St. Paul, MN (US)

( * ) Notice: Subject to any disclaimer, the term of this patent is extended or adjusted under 35 U.S.C. 154(b) by 8 days.

(21) Appl. No.: 18/286,066

(22) PCT Filed: Mar. 9, 2022

(86) PCT No.: PCT/IB2022/052102
§ 371 (c)(1),
(2) Date: Oct. 6, 2023

(87) PCT Pub. No.: WO2022/214888
PCT Pub. Date: Oct. 13, 2022

(65) Prior Publication Data
US 2024/0184507 A1    Jun. 6, 2024

Related U.S. Application Data

(60) Provisional application No. 63/171,792, filed on Apr. 7, 2021.

(51) Int. Cl.
G08B 21/00 (2006.01)
G06F 3/147 (2006.01)
G08B 21/02 (2006.01)

(52) U.S. Cl.
CPC ............. *G06F 3/147* (2013.01); *G08B 21/02* (2013.01)

(58) Field of Classification Search
CPC .......... G06F 3/147; G06F 3/011; G06F 1/163; G08B 21/02; G08B 17/125; G08B 27/001;
(Continued)

(56) References Cited

U.S. PATENT DOCUMENTS 7,787,012 B2    8/2010    Scales et al.
9,021,924 B2    5/2015    Hsieh
(Continued)

FOREIGN PATENT DOCUMENTS

GB        2571118        8/2019
KR    20180048931 A      5/2018
(Continued)

OTHER PUBLICATIONS

"ATN X-Sight 4K Pro 5-20X", Smart Ultra HD Day & Night Vision Rifle Scope, ATN Corporation, [retrieved from the internet on Dec. 6, 2023], URL: <https://www.atncorp.com/x-sight4k-pro-day-night-rifle-scope-5-20x>, 2023, pp.
(Continued)

*Primary Examiner* — Tai T Nguyen
(74) *Attorney, Agent, or Firm* — David B. Patchett

(57) ABSTRACT

The present disclosure provides a remote sensing system. The remote sensing system includes an article of personal protective equipment (PPE) including a display panel configured to be viewed by a wearer of the article of PPE. The remote sensing system further includes a plurality of sensors disposed remotely from the article of PPE. Each of the sensors is configured to generate a respective signal. The remote sensing system further includes a processor communicably coupled to the plurality of sensors and the display
(Continued)

panel of the article of PPE. The processor is configured to receive the respective signals from the plurality of sensors. The processor is further configured to select at least one signal from the respective signals. The processor then determines at least one critical message corresponding to the at least one signal.

19 Claims, 14 Drawing Sheets

(58) Field of Classification Search
CPC .......... G02B 27/017; G02B 2027/0138; H04L 67/564; H04L 67/12
USPC ........................................................ 340/540
See application file for complete search history.

(56) References Cited

U.S. PATENT DOCUMENTS

| | | | |
|---|---|---|---|
| 10,042,164 | B2 | 8/2018 | Kuutti et al. |
| 11,330,062 | B2 | 5/2022 | Bahners et al. |
| 2012/0081214 | A1 | 4/2012 | Alan |
| 2017/0364858 | A1 | 12/2017 | Holler et al. |
| 2019/0180594 | A1 | 6/2019 | Williams |
| 2021/0052024 | A1 | 2/2021 | Mazzarolo et al. |
| 2023/0316888 | A1* | 10/2023 | Thompson ............. A62B 9/006 340/573.1 |
| 2023/0384114 | A1* | 11/2023 | Kruse ................... G01C 21/16 |

FOREIGN PATENT DOCUMENTS

| | | |
|---|---|---|
| KR | 20200118451 A | 10/2020 |
| WO | 2019211691 | 11/2019 |
| WO | 2020208461 | 10/2020 |

OTHER PUBLICATIONS

"On the Horizon: Thermal Images in Your SCBA Face Piece", Fire Apparatus & Emergency Equipment, [retrieved from the internet on Dec. 6, 2023], URL: <https://www.fireapparatusmagazine.com/2014/05/05/on-the-horizon-thermal-images-in-your-scba-face-piece/#gref>, 2014, pp.

International Search Report for PCT International Application No. PCT/IB2022/052102, mailed on Jun. 13, 2022, 4 pages.

* cited by examiner

REMOTE SENSING SYSTEM AND METHOD FOR ARTICLE OF PERSONAL PROTECTIVE EQUIPMENT

CROSS REFERENCE TO RELATED APPLICATIONS

This application is a national stage filing under 35 U.S.C. 371 of PCT/IB2022/052102, filed 9 Mar. 2022, which claims the benefit of U.S. Provisional Patent Application No. 63/171,792, filed 7 Apr. 2021, the disclosure of which is incorporated by reference in its/their entirety herein.

TECHNICAL FIELD

The present disclosure relates generally to one or more articles of personal protective equipment (PPE), and in particular, to a remote sensing system for one or more articles of PPE and a method for use with the one or more articles of PPE.

BACKGROUND

Articles of personal protective equipment (PPE), such as respirators or self-contained breathing apparatus (SCBA), are widely used for protection by users. In some applications, a sensor, such as a thermal imaging camera, is mounted on a facepiece of the SCBA to facilitate a firefighter during firefighting operations. In some other applications, another sensor, such as a temperature sensor, may be mounted on a facepiece of an article of PPE to support a task of the corresponding wearer of the article of PPE. In conventional designs, integrating or mounting one or more sensors on a facepiece of an article of PPE may be challenging, as the mounting of the one or more sensors may require some modifications to already existing facepiece design configurations.

SUMMARY

In a first aspect, the present disclosure provides a remote sensing system. The remote sensing system includes an article of personal protective equipment (PPE) including a display panel configured to be viewed by a wearer of the article of PPE. The remote sensing system further includes a plurality of sensors disposed remotely from the article of PPE. Each of the sensors is configured to generate a respective signal indicative of one or more sensed variables. The remote sensing system further includes a processor communicably coupled to the plurality of sensors and the display panel of the article of PPE. The processor is configured to receive the respective signals from the plurality of sensors. The processor is further configured to select at least one signal from the respective signals based on one or more parameters associated with a work environment of the article of PPE. The processor is also configured to determine at least one critical message corresponding to the at least one signal. The processor is further configured to display the at least one critical message via the display panel.

In a second aspect, the present disclosure provides a remote sensing system. The remote sensing system includes a plurality of articles of PPE. Each of the plurality of articles of PPE includes a respective display panel configured to be viewed by a respective wearer of the respective article of PPE. The remote sensing system further includes a plurality of sensors disposed remotely from the plurality of articles of PPE. Each of the sensors is configured to generate a respective signal indicative of one or more sensed variables. The remote sensing system further includes a processor communicably coupled to the plurality of sensors and the respective display panels of the plurality of articles of PPE. The processor is configured to receive the respective signals from the plurality of sensors. The processor is further configured to select at least one signal from the respective signals based on one or more parameters associated with a work environment of the plurality of articles of PPE. The processor is also configured to determine at least one critical message corresponding to the at least one signal. The processor is further configured to display the at least one critical message via each of the respective display panels.

In a third aspect, the present disclosure provides a method for use with a display panel of an article of personal protective equipment (PPE). The display panel is configured to be viewed by a wearer of the article of PPE. The method includes generating, by a plurality of sensors disposed remotely from the article of PPE, respective signals indicative of one or more sensed variables. The method further includes receiving, by a processor communicably coupled to the plurality of sensors and the display panel of the article of PPE, the respective signals from the plurality of sensors. The method further includes selecting, by the processor, at least one signal from the respective signals based on one or more parameters associated with a work environment of the article of PPE. The method further includes determining, by the processor, at least one critical message corresponding to the at least one signal. The method further includes displaying, by the processor, the at least one critical message via the display panel.

BRIEF DESCRIPTION OF THE DRAWINGS

Exemplary embodiments disclosed herein may be more completely understood in consideration of the following detailed description in connection with the following figures. The figures are not necessarily drawn to scale. Like numbers used in the figures refer to like components. However, it will be understood that the use of a number to refer to a component in a given figure is not intended to limit the component in another figure labeled with the same number.

DETAILED DESCRIPTION

Figure 1:
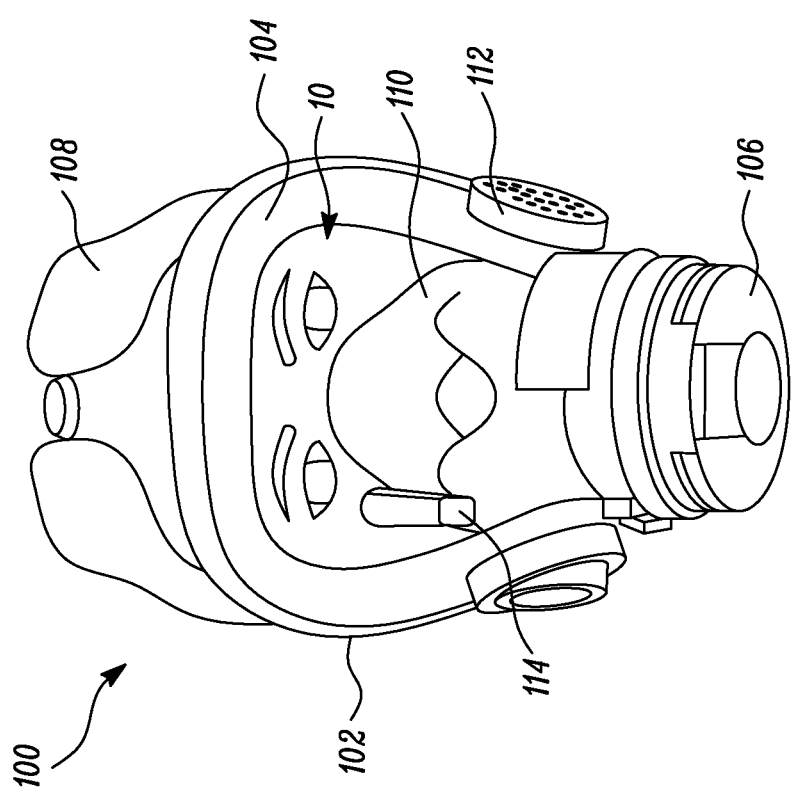
FIG. 1 is a perspective view of an article of PPE, according to an embodiment of the present disclosure.

In the following description, reference is made to the accompanying figures that form a part thereof and in which various embodiments are shown by way of illustration. It is to be understood that other embodiments are contemplated and may be made without departing from the scope or spirit of the present disclosure. The following detailed description, therefore, is not to be taken in a limiting sense.

The present disclosure relates to a remote sensing system, and a method for use with a display panel of an article of personal protective equipment (PPE). The remote sensing system may be associated with various articles of PPE, such as respirators, self-contained breathing apparatus (SCBA), and the like.

In some applications, in order to facilitate a task or an operation of a wearer of an article of PPE, a sensor, such as a thermal imaging camera, is mounted on a facepiece of the article of PPE. Mounting of a sensor on a facepiece of an article of PPE may result in some challenges that involve modifications to existing designs. For example, conventional designs of the facepiece of various articles of PPE may have to be modified in order to ergonomically integrate the sensor. Further, when a sensor is mounted on a facepiece of an article of PPE, the wearer may not be able to get maximum information from an output of the sensor, as a range of the sensor is limited by the wearer's restricted range of motion. In general, the wearer's motion is restricted to his/her area of operation, and therefore, the sensor mounted on the article of PPE may only capture a limited amount of information about a work environment of the article of PPE. Moreover, for an article of PPE with a camera (i.e., sensor) mounted on it, a field of view of that camera may be limited by other articles of PPE, such as a helmet. Thus, while a sensor is mounted on an article of PPE, a range of that particular sensor may be restricted due to a limited range of motion and/or a limited field of view of the wearer of the article of PPE.

Further, to efficiently perform a given task in a work environment while wearing an article of PPE, a wearer of the article of PPE may have to be provided with comprehensive information about the work environment and other details of its various parameters, such as a temperature, a pressure, nearby safety devices, an escape path (such as, e.g., a window), and the like. Conventional articles of PPE and a control system associated with such conventional articles of PPE may not provide such information in detail to respective wearers of the articles of PPE, which can therefore reduce an efficiency of the wearers to perform their corresponding tasks. In some cases, the safety device may include a fire sprinkler, a fire extinguisher, a smoke detector, a fire hydrant, and the like.

The present disclosure provides a remote sensing system. The remote sensing system includes an article of PPE including a display panel configured to be viewed by a wearer of the article of PPE. The remote sensing system further includes a plurality of sensors disposed remotely from the article of PPE. Each of the sensors is configured to generate a respective signal indicative of one or more sensed variables. The remote sensing system further includes a processor communicably coupled to the plurality of sensors and the display panel of the article of PPE. The processor is configured to receive the respective signals from the plurality of sensors. The processor is further configured to select at least one signal from the respective signals based on one or more parameters associated with a work environment of the article of PPE. The processor is also configured to determine at least one critical message corresponding to the at least one signal. The processor is further configured to display the at least one critical message via the display panel.

As the plurality of sensors are disposed remotely from the article of PPE, the proposed remote sensing system may be independent of a range of motion of the wearer and/or the article of PPE. In some cases where one of the sensors from the plurality of sensors is a thermal imaging camera, the remote sensing system may provide a wider field of view, captured by the thermal imaging camera, to the wearer via the display panel. The remote sensing system of the present disclosure may therefore provide a wireless connection between the plurality of sensors and the article of PPE via the processor. Further, as the plurality of sensors are disposed remotely from the article of PPE, there is a flexibility to select desirable locations of the plurality of sensors as per characteristics of the work environment. For example, the remote sensing system may also provide an overhead view of the work environment to the display panel of the article of PPE.

The processor is configured to select at least one signal from the respective signals based on various parameters associated with the work environment of the article of PPE, such as a temperature level, a concentration of at least one hazardous substance, a wind speed, a wind direction, a compass, on-scene time, a distance between at least one safety device and the article of PPE, and a location of at least one of the plurality of sensors with respect to the article of PPE. In some cases, the safety device may include a fire sprinkler, a fire extinguisher, a smoke detector, a fire hydrant, and the like. The processor of the remote sensing system may therefore highlight a set of parameters critical or important to a given work environment, and based on those highlighted parameters, the remote sensing system selects the at least one signal. By following such an approach, the processor may determine any non-critical signals and prevent or delay the display of the corresponding non-critical messages to the wearer. Hence, the processor may only select the signals that have high importance and determine the critical messages corresponding to the selected signals, and subsequently display the critical messages via the display panel.

In some cases, the processor selects a plurality of signals from the respective signals based on respective one or more parameters. The processor further determines a plurality of critical messages corresponding to the plurality of signals. Each critical message has a corresponding degree of criticality. The processor then sequentially displays the plurality of critical messages via the display panel based on the corresponding degrees of criticality. The sequential display of the plurality of critical messages via the display panel may increase an efficiency of the wearer to complete a given task. Moreover, the sequential displaying of the plurality of critical messages via the display panel 20) may also facilitate decision making capability of the wearer in hazardous conditions.

Furthermore, the processor is configured to select one or more signals from the plurality of signals based on an input from the wearer. In some cases, the wearer can select or input desirable parameters or variables via an input button provided on the article of PPE. The selected parameters may be transmitted to the processor via a network. Based on the selected parameters, the processor selects the one or more signals from the plurality of signals. Therefore, the processor may determine the at least one critical message based on the one or more signals selected as per the input from the wearer.

In another embodiment of the present disclosure, the remote sensing system includes a plurality of articles of PPE. Each of the plurality of articles of PPE includes a respective display panel configured to be viewed by a respective wearer of the respective article of PPE. The remote sensing system further includes the plurality of sensors disposed remotely from the plurality of articles of PPE. Each of the sensors is configured to generate a respective signal indicative of one or more sensed variables. The remote sensing system further includes the processor communicably coupled to the plurality of sensors and the respective display panels of the plurality of articles of PPE. The processor is configured to receive the respective signals from the plurality of sensors. The processor is further configured to select at least one signal from the respective signals based on one or more parameters associated with a work environment of the plurality of articles of PPE. The processor is also configured to determine at least one critical message corresponding to the at least one signal. The processor is further configured to display the at least one critical message via each of the respective display panels.

The remote sensing system including the plurality of articles of PPE is independent of a range of motion of the respective wearers and/or the plurality of articles of PPE. As the plurality of sensors are disposed remotely from the plurality of articles of PPE, the remote sensing system may cover a broader area in the work environment. The remote sensing system including the plurality of articles of PPE may provide a wireless connection between the plurality of sensors and the plurality of articles of PPE. Further, as the plurality of sensors are disposed remotely from the plurality of articles of PPE, there is a flexibility to select desirable locations of the plurality of sensors as per characteristics of the work environment. For example, the remote sensing system including the plurality of articles of PPE may also provide an overhead view of the work environment to the respective display panels of the plurality of articles of PPE.

The processor is configured to select at least one signal from the respective signals based on various parameters associated with the work environment of the plurality of articles of PPE, such as a temperature level, a concentration of at least one hazardous substance, a wind speed, a wind direction, a compass, on-scene time, a distance between at least one safety device and the article of PPE, and a location of at least one of the plurality of sensors with respect to the article of PPE. The processor of the remote sensing system including the plurality of articles of PPE may therefore highlight a set of parameters critical or important to the given work environment, and based on those highlighted parameters, the remote sensing system selects the at least one signal. By following such an approach, the processor may determine any non-critical signals and prevent or delay the display of the corresponding non-critical messages to the respective wearers. Hence, the processor may only select the signals that have high importance and determine the critical messages corresponding to the selected signals, and subsequently display the critical messages via the respective display panels of the plurality of articles of PPE. In some cases, the safety device may include a fire sprinkler, a fire extinguisher, a smoke detector, a fire hydrant, and the like.

In some cases, the processor of the remote sensing system, including the plurality of articles of PPE, selects a plurality of signals from the respective signals based on respective one or more parameters. The processor further determines a plurality of critical messages corresponding to the plurality of signals. Each critical message has a corresponding degree of criticality. The processor then sequentially displays the plurality of critical messages via the respective display panels of the plurality of articles of PPE based on the corresponding degrees of criticality. The sequential displaying of the plurality of critical messages via the respective display panels may increase an efficiency of the respective wearers to complete their respective tasks. Moreover, the sequential display of the plurality of critical messages via the respective display panels may also facilitate decision making capability of the respective wearers of the plurality of articles of PPE in hazardous conditions.

Furthermore, the processor is configured to select one or more signals from the plurality of signals based on respective inputs from the wearer. In some cases, the respective wearers can select or input desirable parameters or variables via respective input buttons provided on the plurality of articles of PPE. The selected parameters may be transmitted to the processor via a network. Based on the selected parameters, the processor selects the one or more signals from the plurality of signals. Therefore, the processor may determine the at least one critical message based on the one or more signals selected as per the respective inputs from the respective wearers of the plurality of articles of PPE.

Referring now to Figures, FIG. 1 illustrates a perspective view of an article of personal protective equipment (PPE) 100 in accordance with an embodiment of the present disclosure. In some embodiments, the article of PPE 100 includes a respiratory protective equipment (RPE), a self-contained breathing apparatus (SCBA), a face shield, or a safety goggle.

The article of PPE 100 includes a mask 102 holding a lens 104 and an air purifying cartridge 106. The mask 102 is adapted to be secured to a face of a wearer 10 by a head harness 108. The article of PPE 100 provides breathing gas to the wearer 10 and/or filters breathing air for the wearer 10, which includes air which has been filtered or otherwise treated so that airborne contaminants are removed therefrom. While the mask 102 described in connection with the illustrated embodiment is constructed for attachment of an air purifying cartridge 106 to serve as a respirator, it should be understood that the mask 102 may alternatively be constructed for attachment of hoses for delivering oxygen or other breathable gas, as well as adapters to accept hoses, filters and/or regulators specific to particular functions or to be used in particular environments.

The mask 102 covers the eyes, nose and mouth of the wearer 10 for protecting the wearer 10 from airborne contaminants by means of the air purifying cartridge 106. While the mask 102 is shown to have one air purifying cartridge 106 centrally located in front of the wearer's mouth, it should be understood that the mask 102 can be provided with any number of cartridges 106 and the cartridges 106 may be positioned at any suitable location. Various types of cartridges 106 (some containing gas absorbents and others containing mechanical filters and others containing both) may be interchangeably attached to the mask 102. Further, the mask 102 is fitted for a particular use with the type of cartridge 106 that is suitable for removing the particular contaminants in the environment at the time of use. The article of PPE 100 also includes one or more exhalation valves 112 provided on the sides or at the front of the mask 102.

The article of PPE 100 further includes a nose cup 110 surrounding the wearer's mouth and nose. The nose cup 110 is positioned behind the lens 104. To deliver air to the wearer 10, a flow path (not shown) is defined between the cartridge 106 and the nose cup 110. In some embodiments, the nose cup 110 is coupled to the lens 104. In some other embodiments, the nose cup 110 is coupled to the mask 102. In some embodiments, the article of PPE 100 does not include the nose cup 110.

The article of PPE 100 further includes a display panel 114 configured to be viewed by the wearer 10 of the article of PPE 100. In some embodiments, the display panel 114 is attached to the lens 104. In some embodiments, the display panel 114 may also be attached to the nose cup 110.

In some embodiments, the article of PPE 100 may be used for any of a number of applications, such as SCBA applications, air purification respirator (APR) applications, powered air purification respirator (PAPR) applications, and the like. In some embodiments, the mask 102 may be used by a wearer for different applications by interchanging the components attached to the mask 102 for delivering or expelling air. For example, by changing the type of cartridge 106, or by attaching a hose to the mask 102, the wearer 10 may be able to use the article of PPE 100 in a different environment.

Figure 2A:
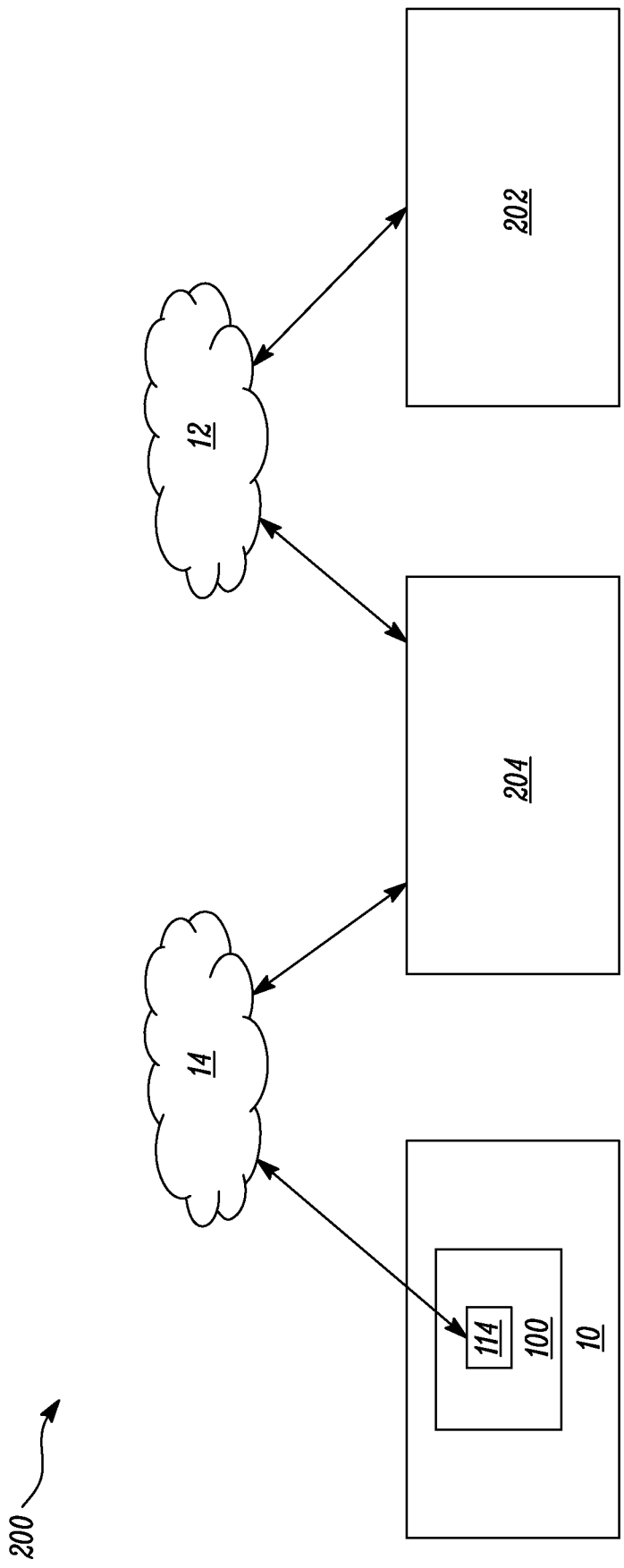
FIG. 2A is a schematic block diagram of a remote sensing system including the article of PPE of FIG. 1, according to an embodiment of the present disclosure.

FIG. 2A illustrates a schematic block diagram of a remote sensing system 200 in accordance with an embodiment of the present disclosure. The remote sensing system 200 includes the article of PPE 100. The remote sensing system 200 further includes a plurality of sensors 202 disposed remotely from the article of PPE 100. The remote sensing system 200 further includes a processor 204 communicably coupled to the plurality of sensors 202 and the display panel 114 of the article of PPE 100. Specifically, the processor 204 is communicably coupled to the plurality of sensors 202 via a first network 12, and the processor 204 is communicably coupled to the display panel 114 via a second network 14. In some embodiments, the plurality of sensors 202 is wirelessly connected to the display panel 114 of the article of PPE 100 via the processor 204. Specifically, the plurality of sensors 202 is wirelessly connected to the display panel 114 of the article of PPE 100 via the first network 12, the processor 204, and the second network 14.

With continued reference to FIG. 2A, in some embodiments, at least one of the first and second networks 12, 14 is a short-range wireless network. In some other embodiments, at least one of the first and second networks 12, 14 is a long-range wireless network. In some embodiments, the first network 12 is same as the second network 14. In that case, there is only one network that communicably couples the processor 204 with the plurality of sensors 202 as well as with the display panel 114.

In some embodiments, the processor 204 is disposed on the article of PPE 100. In some other embodiments, the processor 204 is remote from the article of PPE 100. In some embodiments, the remote sensing system 200 includes a remote server 18 (shown in FIG. 3A) including the processor 204. In some embodiments, the remote server 18 includes an incident command system (not shown). Generally, the incident command system is used at single- and multi-alarm emergencies to coordinate and manage responders and resources. The primary role of the incident command system is to establish planning and management functions for responding partners to work in a coordinated and systematic approach.

Figure 2B:
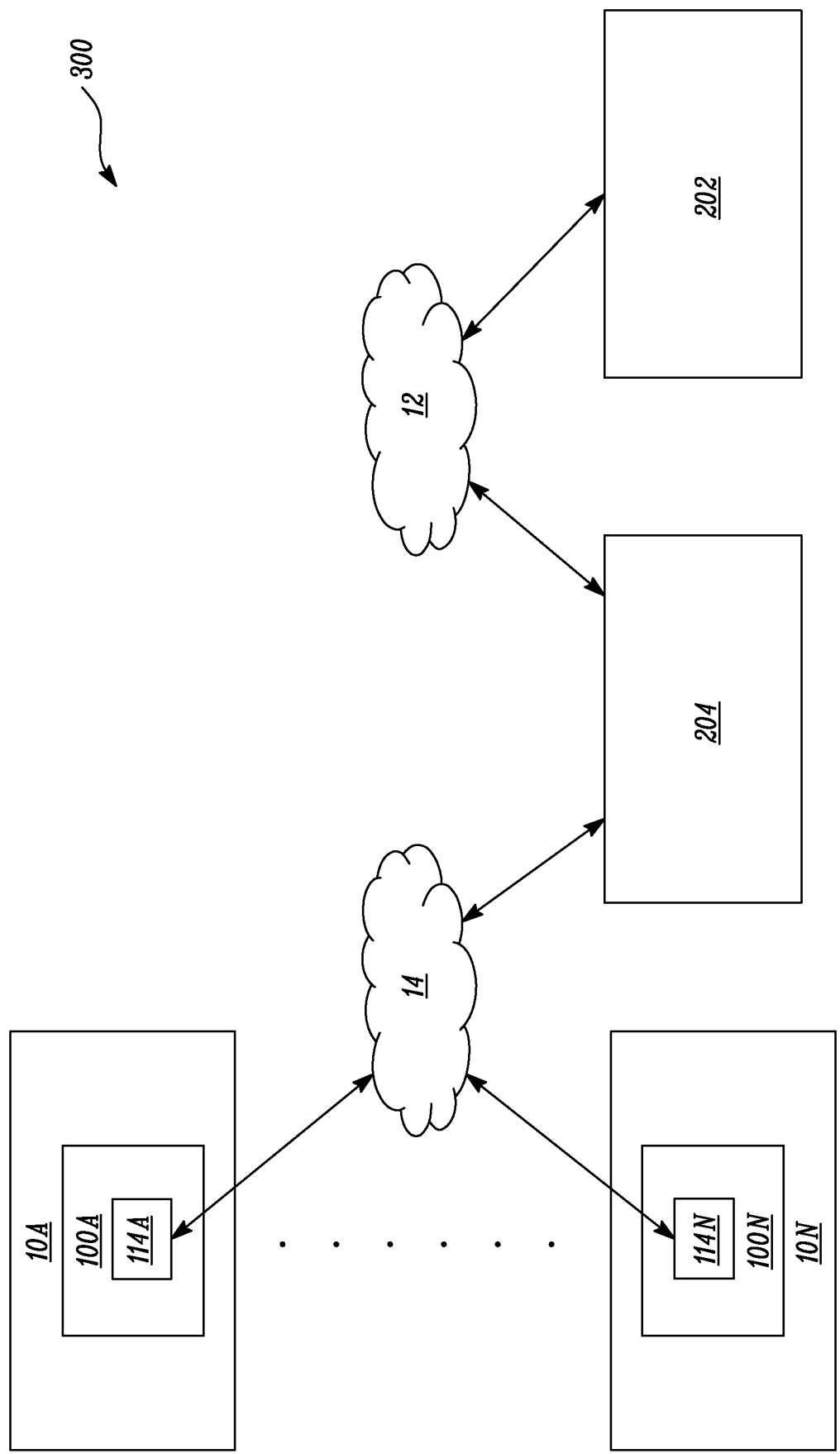
FIG. 2B is a schematic block diagram of a remote sensing system including a plurality of articles of PPE, according to an embodiment of the present disclosure.

FIG. 2B illustrates a schematic block diagram of a remote sensing system 300 in accordance with an embodiment of the present disclosure. The remote sensing system 300 is substantially similar to the remote sensing system 200 illustrated in FIG. 2A. Common components between the remote sensing system 200 and the remote sensing system 300 are illustrated by the same reference numerals. However, the remote sensing system 300 includes a plurality of articles of PPE 100A-100N (collectively referred to as "articles of PPE 100"). Each of the plurality of articles of PPE 100A-100N includes a respective display panel 114A-114N (collectively referred to as "display panels 114") configured to be viewed by a respective wearer 10A-10N (collectively referred to as "wearers 10") of the respective article of PPE 100A-100N. Further, the plurality of sensors 202 is disposed remotely from the plurality of articles of PPE 100A-100N. The processor 204 is communicably coupled to the plurality of sensors 202 and the respective display panels 114A-114N of the plurality of articles of PPE 100A-100N. Specifically, the processor 204 is communicably coupled to the respective display panels 114A-114N of the plurality of articles of PPE 100A-100N via the second network 14. In some embodiments, the plurality of sensors 202 is wirelessly 20) connected to the respective display panels 114A-114N of the plurality of articles of PPE 100A-100N via the processor 204. Specifically, the plurality of sensors 202 is wirelessly connected to the respective display panels 114A-114N of the plurality of articles of PPE 100A-100N via the first network 12, the processor 204, and the second network 14. In some embodiments, the remote sensing system 300 may include numerous articles of PPE in addition to the articles of PPE 100A-100N illustrated in FIG. 2B.

In some embodiments, the first network 12 is same as the second network 14. In that case, there is only one network that communicably couples the processor 204 with the plurality of sensors 202 as well as with the respective display panels 114A-114N.

With continued reference to FIG. 2B, in some embodiments, the processor 204 is disposed on at least one article of PPE from the plurality of articles of PPE 100A-100N. In some other embodiments, the processor 204 is remote from the plurality of articles of PPE 100A-100N. In some embodiments, the remote sensing system 300 includes the remote server 18 (shown in FIG. 3B) including the processor 204.

With continued reference to FIG. 2B, in some embodiments, each of the plurality of articles of PPE 100A-100N includes an RPE, an SCBA, a face shield, or a safety goggle.

In some embodiments, the plurality of sensors 202 (shown in FIGS. 2A and 2B) is mounted on one or more of a remote vehicle, an unmanned vehicle, an automated remotely controlled machine, a tiller truck, a light tower, a drone, an article of PPE of another wearer, and a smart building infrastructure. In some other embodiments, the plurality of sensors 202 is mounted on various locations at a worksite, such as one or more entrances and/or exits of a work environment of an article of PPE, elevators, stairs, etc.

In some embodiments, each of the plurality of sensors 202 includes a thermal imaging camera, a video camera, a gas detector, or a sighting device. In an example, during firefighting operations, thermal imaging camera technology can be used to locate a source of a fire, find victims, and optimize the process of searching for fire extension in the void spaces in structural walls. In an example, during firefighting operations, the video camera can be used to record a video feed and capture pictures of an area in vicinity of the wearer 10, or other firefighters or persons which may be trapped due to fire.

In some embodiments, the plurality of sensors 202 may include gas dosimeters. Gas dosimeters can be used to monitor exposure of the wearer 10 to toxic industrial chemicals and radiations. In some embodiments, the plurality of sensors 202 may include heat flux measurement gauges. In an example, during firefighting operations, the heat flux measurement gauge can be used to monitor potential flashover conditions by measuring the temperature in an upper layer of air. Typical flashover heat fluxes are in the 10 kW/m$^2$ to 20 kW/m$^2$ range, which is associated with an upper layer temperature of around 600° C. By monitoring the upper layer heat flux, it may be possible to predict impending flashover conditions. In some embodiments, the plurality of sensors 202 may include a personal alert safety system (PASS). In an example, during firefighting operations, the PASS can be used to detect a firefighter's motion in a work environment of the firefighter. In some embodiments, the plurality of sensors 202 may include other sensing devices, such as pressure sensors, temperature sensors, etc.

Referring to FIGS. 1, 2A and 2B, as the plurality of sensors 202 are disposed remotely from the article of PPE 100, the proposed remote sensing system 200 may be independent of a range of motion of the wearer 10 and/or the article of PPE 100. In some cases where one of the sensors from the plurality of sensors 202 is a thermal imaging camera, the remote sensing system 200 may provide a wider field of view, captured by the thermal imaging camera, to the wearer 10 via the display panel 114. The remote sensing system of the present disclosure may therefore provide a wireless connection between the plurality of sensors 202 and the article of PPE 100 via the processor 204. Further, as the plurality of sensors 202 are disposed remotely from the article of PPE 100, there is a flexibility to select desirable locations of the plurality of sensors 202 as per characteristics of a work environment of the article of PPE 100. For example, the remote sensing system 200 may also provide an overhead view of the work environment to the display panel 114 of the article of PPE 100.

The remote sensing system 300 may be independent of a range of motion of the respective wearers 10A-10N and/or the plurality of articles of PPE 100A-100N. As the plurality of sensors 202 are disposed remotely from the plurality of articles of PPE 100A-100N, the remote sensing system 300 may cover a broader area in a work environment of the plurality of articles of PPE 100A-100N. The remote sensing system 300 may provide a wireless connection between the plurality of sensors 202 and the plurality of articles of PPE 100A-100N. Further, as the plurality of sensors 202 are disposed remotely from the plurality of articles of PPE 100A-100N, there is a flexibility to select desirable locations of the plurality of sensors 202 as per characteristics of the work environment of the plurality of articles of PPE 100A-100N. For example, the remote sensing system 300 may also provide an overhead view of the work environment to the respective display panels 114A-114N of the plurality of articles of PPE 100A-100N.

Figure 3A:
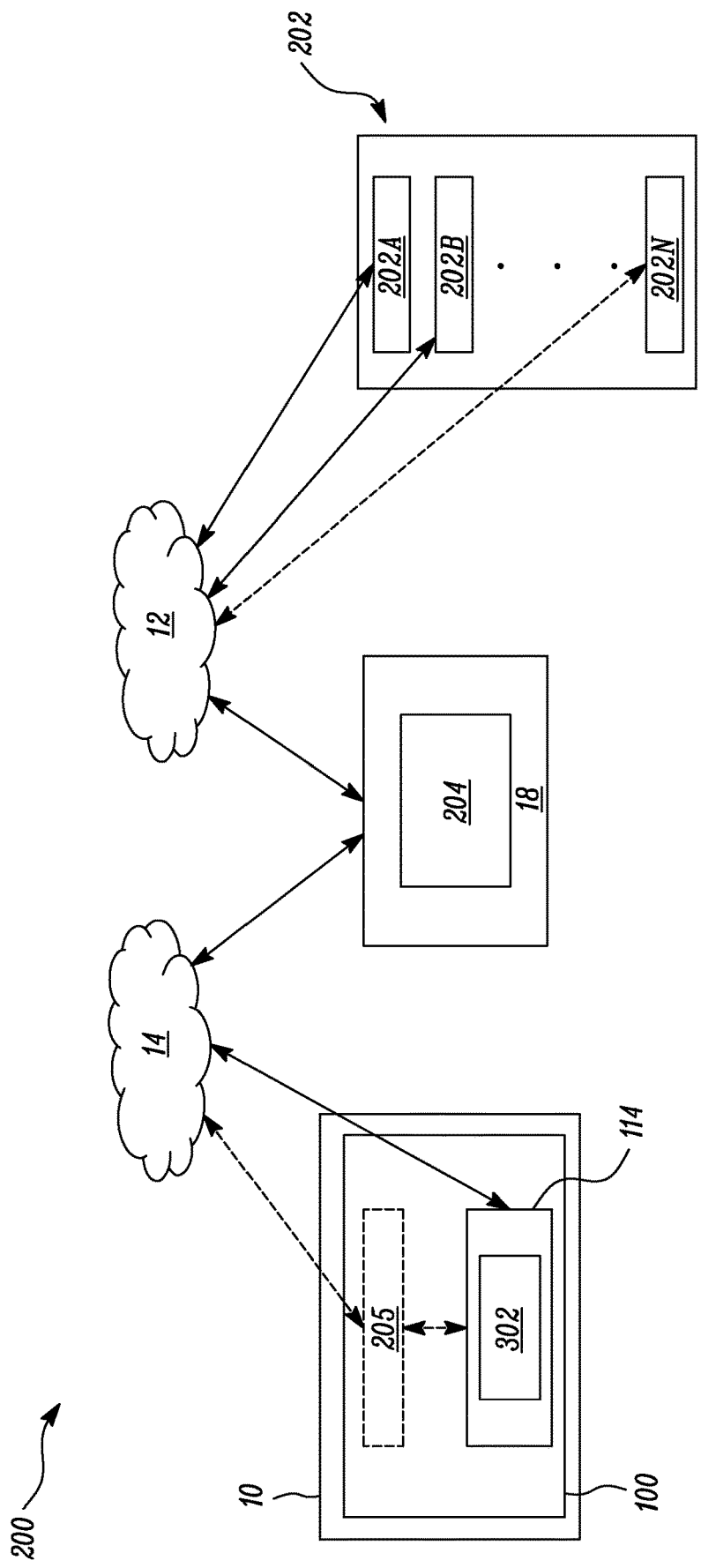
FIG. 3A is a detailed schematic block diagram of the remote sensing system of FIG. 2A, according to an embodiment of the present disclosure.
Figure 3B:
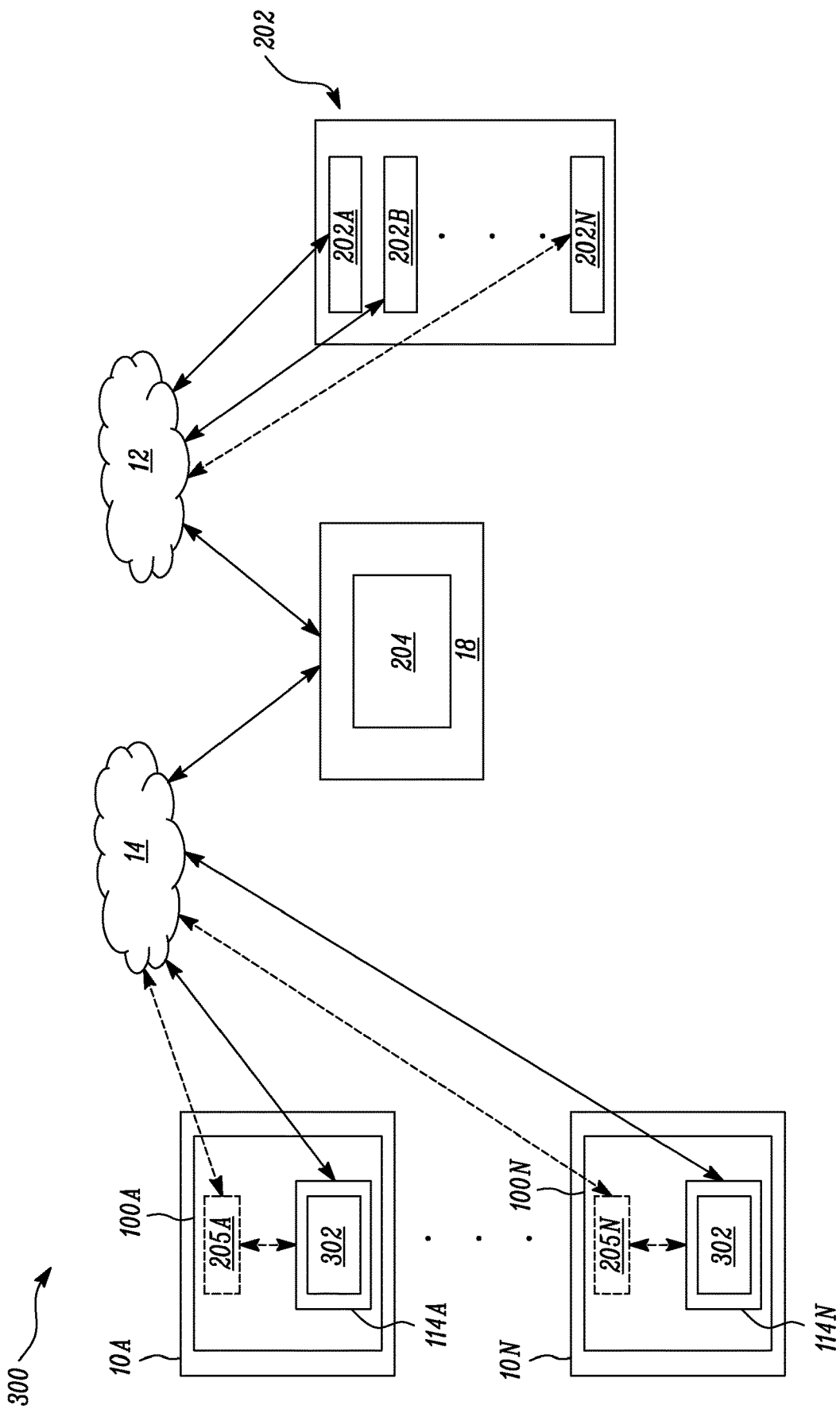
FIG. 3B is a detailed schematic block diagram of the remote sensing system of FIG. 2B, according to an embodiment of the present disclosure.

FIG. 3A illustrates a detailed schematic block diagram of the remote sensing system 200 according to an embodiment of the present disclosure. FIG. 3B illustrates a detailed schematic block diagram of the remote sensing system 300 according to an embodiment of the present disclosure. The plurality of sensors 202 includes sensors 202A-202N (collectively referred to as "sensors 202"). With reference to FIGS. 3A and 3B, each of the sensors 202A-202N is configured to generate a respective signal indicative of one or more sensed variables. In some examples, the sensed variables 20) may include temperature levels, pressure levels, concentration of harmful gases/chemicals/hazardous substances, wind speed, wind direction, a compass, on-scene time, locations of the plurality of articles of PPE 100A-100N with respect to each other, a distance between a given article of PPE and a sensor 202A-202N from the plurality of sensors 202, etc.

In some embodiments, the processor 204 is configured to receive the respective signals from the plurality of sensors 202. In some embodiments, the processor 204 is configured to receive the respective signals from the plurality of sensors 202 via the first network 12 (shown in FIGS. 2A and 2B) between the processor 204 and the plurality of sensors 202.

With reference to FIG. 3A, in some embodiments, the processor 204 is configured to select at least one signal from the respective signals based on one or more parameters associated with the work environment of the article of PPE 100. With reference to FIG. 3B, in some embodiments, the processor 204 is configured to select at least one signal from the respective signals based on one or more parameters associated with the work environment of the plurality of articles of PPE 100A-100N.

In some embodiments, the one or more parameters include one or more of a temperature level, a concentration of at least one hazardous substance, a wind speed, a wind direction, a compass, on-scene time, a distance between at least one safety device and the article of PPE 100, a location of at least one of the plurality of sensors 202 with respect to the article of PPE 100, and a location of the at least one of the plurality of sensors 202 with respect to each of the plurality of articles of PPE 100A-100N. In some cases, the safety device may include a fire sprinkler, a fire extinguisher, a smoke detector, a fire hydrant, and the like.

In some embodiments, the processor 204 is configured to determine at least one critical message 302 corresponding to the at least one signal. Specifically, the processor 204 is configured to determine the at least one critical message 302 corresponding to the at least one signal selected by the processor 204 from the respective signals. With reference to FIG. 3A, in some embodiments, the processor 204 is configured to display the at least one critical message 302 via the display panel 114. In some embodiments, the processor 204 is configured to transmit the at least one critical message 302 to the display panel 114 via the second network 14 between the processor 204 and the display panel 114 of the article of PPE 100. With reference to FIG. 3B, in some embodiments, the processor 204 is configured to display the at least one critical message 302 via each of the respective display panels 114A-114N. In some embodiments, the processor 204 is configured to transmit the at least one critical message 302 to each of the respective display panels 114A-114N via the second network 14 between the processor 204 and the respective display panels 114A-114N.

The processor 204 of the remote sensing system 200 may therefore highlight a set of parameters critical or important to a given work environment, and based on those highlighted parameters, the remote sensing system 200 selects the at least one signal. By following such an approach, the processor 204 may determine any non-critical signals and prevent or delay the display of corresponding non-critical messages to the wearer 10. Further, the processor 204 may determine any non-critical signals and prevent or delay the display of corresponding non-critical messages to the wearers 10A-10N, via the respective display panels 114A-114N of the plurality of articles of PPE 100A-100N. Hence, the processor 204 may only select the signals that have high importance and determine the critical messages corresponding to the selected signals, and subsequently display the critical messages via the display panel 114.

With reference to FIG. 3A, in some embodiments, the article of PPE 100 further includes a controller 205 communicably coupled to the processor 204 and the display panel 114. The controller 205 is communicably coupled to the processor 204 via the second network 14. The controller 205 is configured to control the display panel 114 to display the at least one critical message 302 based on a display signal received from the processor 204. Therefore, in some cases, upon selection of the at least one signal and determination of the at least one critical message 302 by the processor 204, the processor 204 transmits the at least one critical message 302 to the display panel 114 and displays the at least one critical message 302 via the display panel 114. In some cases, upon selection of the at least one signal and determination of the at least one critical message 302 by the processor 204, the processor 204 transmits a display signal to the controller 205, such that the controller 205 controls the display panel 114 to display the at least one critical message 302.

Furthermore, with reference to FIG. 3B, in some embodiments, each of the plurality of articles of PPE 100A-100N includes a respective controller 205A-205N (collectively referred to as "controllers 205") communicably coupled to the processor 204 and the respective display panel 114A-114N. The respective controller 205A-205N is configured to control the respective display panel 114A-114N to display the at least one critical message 302 based on a respective display signal received from the processor 204. Therefore, in some cases, upon selection of the at least one signal and determination of the at least one critical message 302 by the processor 204, the processor 204 transmits the at least one critical message 302 to each of the respective display panels 114A-114N and displays the at least one critical message 302 via each of the respective display panels 114A-114N. In some cases, upon selection of the at least one signal and determination of the at least one critical message 302 by the processor 204, the processor 204 transmits the respective display signal to the respective controller 205A-205N, such that the respective controller 205A-205N controls the respective display panel 114A-114N to display the at least one critical message 302.

In some embodiments, the at least one critical message 302 includes one or more of an audio-visual signal, a still image, a pictograph, a symbol, digital data, a slow-motion video, a live video feed, and an indication and a location of the sensor 202A-202N generating the at least one signal corresponding to the at least one critical message 302.

In an example, during firefighting operations, the at least one critical message 302 in the form of an audio-visual signal may be a visual warning and an audible warning. The visual warning may include a highlighted portion displayed on the display panel 114 of the article of PPE 100. In some cases, the highlighted portion may be displayed on each of the respective display panels 114A-114N of the respective articles of PPE 100A-100N. The audible warning may indicate the highlighted portion on the display panel 114. In an example, during firefighting operations, the at least one critical message 302 in the form of an audio-visual signal may be an audible alert indicating a detection of a harmful chemical in a highlighted portion displayed on the display panel 114.

In an example, during firefighting operations, the at least one critical message 302 in the form of a still image may be a picture of an area which is subjected to maximum fire. In an example, during firefighting operations, the at least one critical message 302 in the form of a still image may be a picture of one or more exit routes from an area subjected to fire. In an example, the at least one critical message 302 in the form of a still image may be a heat picture of an area captured by a thermal imaging camera. In work environments, such as industrial structures and factories, the at least one critical message 302 in the form of a still image is preferred over the at least one critical message 302 in the form of a video, because of slower data transfer caused by a large number of obstructions.

In an example, during firefighting operations, the at least one critical message 302 in the form of a pictograph may consist of steps to treat a burn right away, to display a path for safe exit, etc.

In an example, the at least one critical message 302 in the form of digital data may be a temperature level, a pressure level, wind speed, etc. In an example, the at least one critical message 302 in the form of digital data may be explosive limits for combustible gases.

While a critical message 302 corresponding to at least one signal is displayed on the display panel 114, the critical message 302 may include information about location of the sensor 202A-202N, generating the at least one signal corresponding to the critical message 302, relative to the display panel 114. In an example, during firefighting operations, the critical message 302 may include a heat diagram captured by a thermal imaging camera, and a location and an information of the thermal imaging camera generating the heat diagram of a particular area. The information of the thermal imaging camera may include a serial number of the thermal imaging camera, a field of view captured by the thermal imaging camera, a distance between the article of PPE 100 and the thermal imaging camera, etc.

Figure 4A:
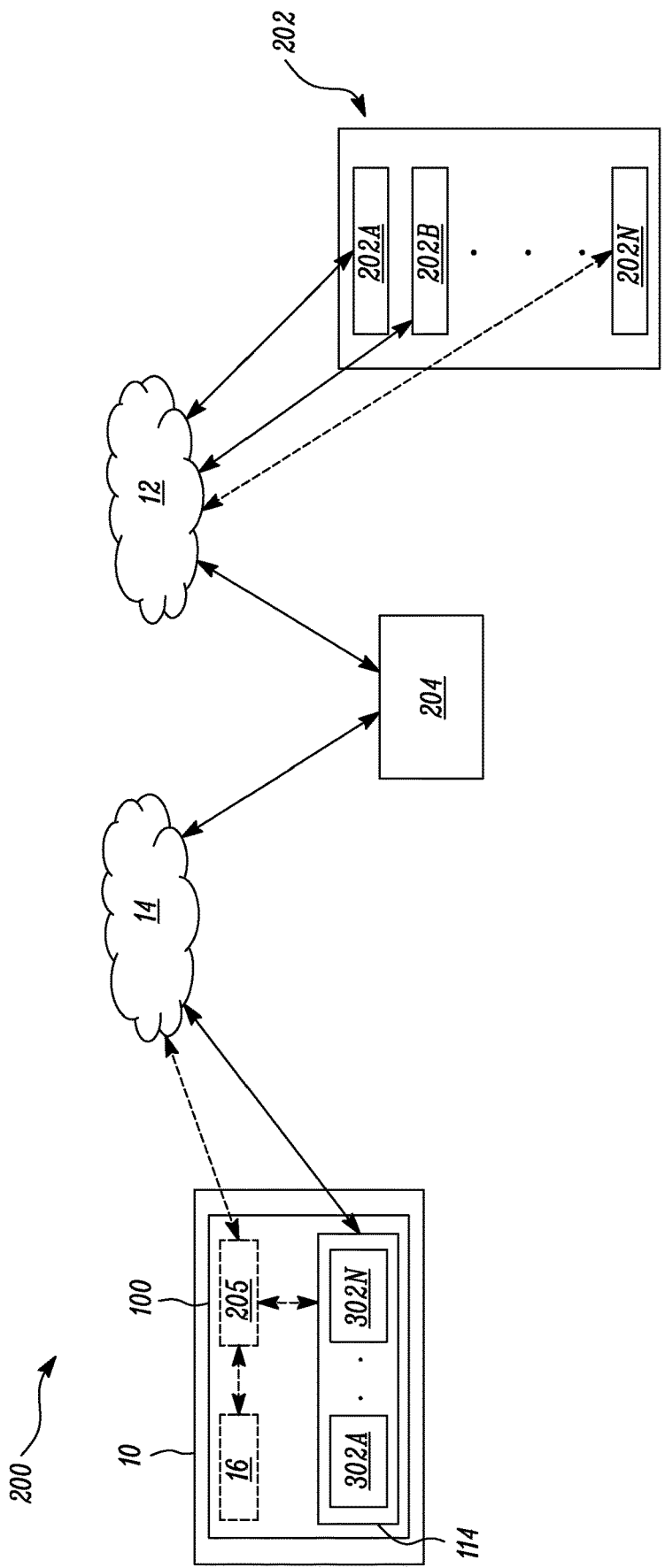
FIG. 4A is a detailed schematic block diagram of the remote sensing system of FIG. 3A, according to another embodiment of the present disclosure.
Figure 4B:
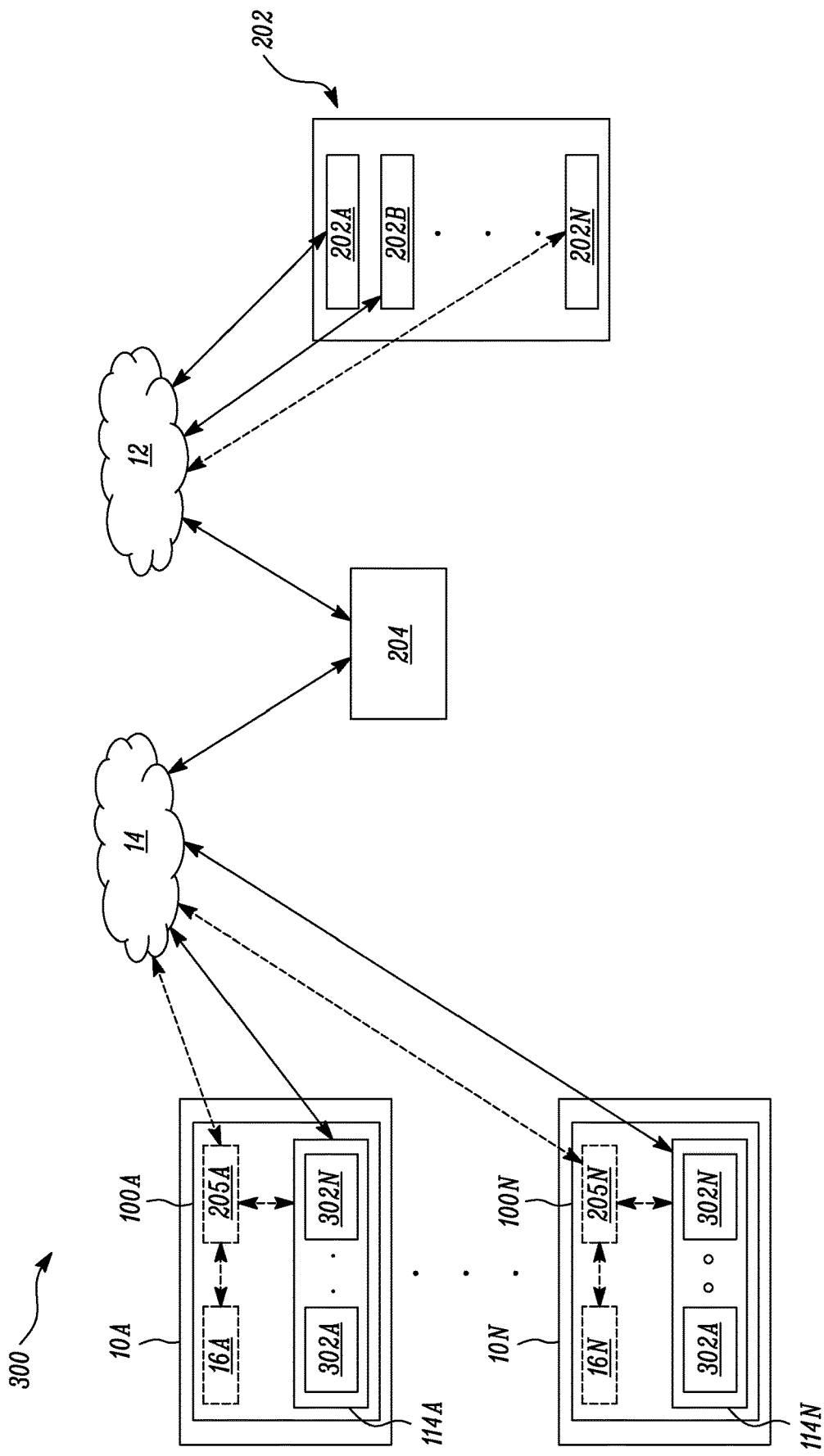
FIG. 4B is a detailed schematic block diagram of the remote sensing system of FIG. 3B, according to another embodiment of the present disclosure.

FIG. 4A illustrates another detailed schematic block diagram of the remote sensing system 200 according to an embodiment of the present disclosure. FIG. 4B illustrates another detailed schematic block diagram of the remote sensing system 300 according to an embodiment of the present disclosure.

In some embodiments, the at least one signal includes a plurality of signals corresponding to a set of sensors (not shown) from the plurality of sensors 202. The processor 204 is configured to select the plurality of signals from the respective signals based on one or more parameters. In some embodiments, the processor 204 selects the plurality of signals from the respective signals based on one or more parameters associated with the work environment of the PPE 100 (shown in FIG. 4A). In some embodiments, the processor 204 selects the plurality of signals from the respective signals based on one or more parameters associated with the work environment of the plurality of articles of PPE 100A-100N (shown in FIG. 4B).

With reference to FIG. 4A, in some embodiments, the processor 204 is configured to select one or more signals from the plurality of signals based on an input from the wearer 10. In some embodiments, the input is provided with the help of an input button 16 provided on the article of PPE 100 and communicably coupled to the controller 205 disposed on the article of PPE 100. The wearer 10 can select or input specific parameters or variables via the input button 16 which are transmitted to the processor 204 via the controller 205 and the second network 14. Based on information transmitted to the processor 204 from the input button 16, the processor 204 selects the one or more signals from the plurality of signals corresponding to a set of sensors from the plurality of sensors 202. In some embodiments, the input is provided with the help of a handheld device (not shown) associated with the wearer 10 and communicably coupled to the processor 204. In such cases, the input from the handheld device is received by the processor 204 to select the one or more signals from the plurality of signals corresponding to a set of sensors from the plurality of sensors 202.

The wearer 10 can select or input desirable parameters or variables via the input button 16 provided on the article of PPE 100. The selected desirable parameters may be transmitted to the processor 204 via the second network 14. Based on the selected desirable parameters, the processor 204 selects the one or more signals from the plurality of signals. Therefore, the processor 204 may determine the at least one critical message 302 based on the one or more signals determined as per the input from the wearer 10.

With reference to FIG. 4B, in some embodiments, the processor 204 is configured to select one or more signals from the plurality of signals based on respective inputs from the respective wearers 10A-10N. In some embodiments, the respective inputs are provided with the help of respective input buttons 16A-16N (collectively referred to as "input buttons 16") provided on the respective articles of PPE 100A-100N and communicably coupled to the respective controllers 205A-205N disposed on the respective articles of PPE 100A-100N. The respective wearers 10A-10N can select or input specific respective parameters or variables via the respective input buttons 16A-16N which are transmitted to the processor 204 via the respective controllers 205A-205N and the second network 14. Based on information transmitted to the processor 204 from the respective input buttons 16A-16N, the processor 204 selects the one or more signals from the plurality of signals corresponding to a set of sensors from the plurality of sensors 202. In some embodiments, the input is provided with the help of respective handheld devices (not shown) associated with the respective wearers 10A-10N and communicably coupled to the processor 204. In such cases, the input from the respective handheld devices is received by the processor 204 to select the one or more signals from the plurality of signals corresponding to a set of sensors from the plurality of sensors 202.

The respective wearers 10A-10N can select or input desirable parameters or variables via respective input buttons 16A-16N provided on the plurality of articles of PPE 100A-100N. The selected desirable parameters may be transmitted to the processor 204 via the second network 14. Based on the selected desirable parameters, the processor 204 selects the one or more signals from the plurality of signals. Therefore, the processor 204 may determine the at least one critical message 302 based on the one or more signals determined as per the respective inputs from the respective wearers 10A-10N of the plurality of articles of PPE 100A-100N.

Referring to FIGS. 4A and 4B, the processor 204 is further configured to determine a plurality of critical messages 302A-302N corresponding to the plurality of signals. Each critical message 302A-302N has a corresponding degree of criticality. One of the critical messages from the plurality of critical messages 302A-302N has the highest degree of criticality. In some cases, during firefighting operations, the degree of criticality of the plurality of critical messages 302A-302N may be selected by the processor 204 based on importance of one or parameters associated with a work environment. In some cases, during firefighting operations, the degree of criticality of the plurality of critical messages 302A-302N may be selected by the processor 204 based on an input from the wearer 10. In firefighting operations, some of the factors or parameters to decide the degree of criticality of the plurality of critical messages 302A-302N may include a temperature level, an adequate means of escape, a distance from current location of the wearer 10 to an exit door, location of smoke detection systems, flame retardant materials in a work environment, a concentration of a harmful chemical, etc. The processor 204 may utilize such factors or parameters to determine the degree of criticality of the plurality of critical messages 302A-302N.

Referring now to FIG. 4A, after determining, by the processor 204, the plurality of critical messages 302A-302N corresponding to the plurality of signals, the processor 204 is configured to sequentially display the plurality of critical messages 302A-302N via the display panel 114 based on the corresponding degrees of criticality. In an example, where the critical message 302A has the highest degree of criticality, then the processor 204 first displays, via the display panel 114, the critical message 302A and then displays, via the display panel 114, the other critical messages from the plurality of critical messages 302A-302N based on their respective degrees of criticality. In an example, where the critical message 302N has the highest degree of criticality, then the processor 204 first displays, via the display panel 114, the critical message 302N and then displays, via the display panel 114, the other critical messages from the plurality of critical messages 302A-302N based on their respective degrees of criticality.

The sequential displaying of the plurality of critical messages 302A-302N via the display panel 114 may increase an efficiency of the wearer 10 to complete a given task. Moreover, the sequential displaying of the plurality of critical messages 302A-302N via the display panel 114 may also facilitate decision making capability of the wearer 10 in hazardous conditions.

Referring now to FIG. 4B, after determining, by the processor 204, the plurality of critical messages 302A-302N corresponding to the plurality of signals, the processor 204 is configured to sequentially display, via each of the respective display panels 114A-114N, the plurality of critical messages 302A-302N based on the corresponding degrees of criticality. In an example, where the critical message 302A has the highest degree of criticality, then the processor 204 first displays, via the respective display panels 114A-114N, the critical message 302A and then displays, via the respective display panels 114A-114N, the other critical messages from the plurality of critical messages 302A-302N based on their respective degrees of criticality. In an example, where the critical message 302N has the highest degree of criticality, then the processor 204 first displays, via the respective display panels 114A-114N, the critical message 302N and then displays, via the respective display panels 114A-114N, the other critical messages from the plurality of critical messages 302A-302N based on their respective degrees of criticality.

The sequential displaying of the plurality of critical messages 302A-302N via the respective display panels 114A-114N may increase an efficiency of the respective wearers 10A-10N to complete their respective tasks. Moreover, the sequential displaying of the plurality of critical messages 302A-302N via the respective display panels 114A-114N may also facilitate decision making capability of the respective wearers 10A-10N of the plurality of articles of PPE 100A-100N in hazardous conditions.

Referring to FIGS. 4A and 4B, in some embodiments, the processor 204 is further configured to select, from the respective signals, at least two signals corresponding to at least two sensors from the plurality of sensors 202 based on respective one or more parameters. The processor 204 is further configured to determine a combined critical message based on the at least two signals. In some embodiments, the critical message 302A is a combined critical message, based on at least two signals selected by the processor 204. In some embodiments, the critical message 302N is a combined critical message, based on at least two signals selected by the processor 204. In an example, a first signal may correspond to a temperature level of a given area, and a second signal may correspond to a picture of the same area. Therefore, a combined critical message may include a picture of the area with the temperature level of that area mentioned in the picture. In an example, during firefighting operations, a first signal may correspond to a location of an exit door with respect to the article of PPE 100, and a second signal may correspond to a distance between the exit door and the article of PPE 100. Therefore, a combined critical message may include the location of the exit door with respect to the article of PPE 100 and the distance of the exit door from the article of PPE 100.

With reference to FIG. 4A, the processor 204 is further configured to display the combined critical message via the display panel 114. In other words, the processor 204 transmits the combined critical message to the display panel 114 via the second network 14, and the processor 204 further sends a command to the display panel 114 to display the combined critical message. With reference to FIG. 4B, the processor 204 is further configured to display the combined critical message via each of the respective display panels 114A-114N. In other words, the processor 204 transmits the combined critical message to each of the respective display panels 114A-114N via the second network 14, and the processor 204 further sends a command to each of the respective display panels 114A-114N to display the combined critical message.

Figure 5:
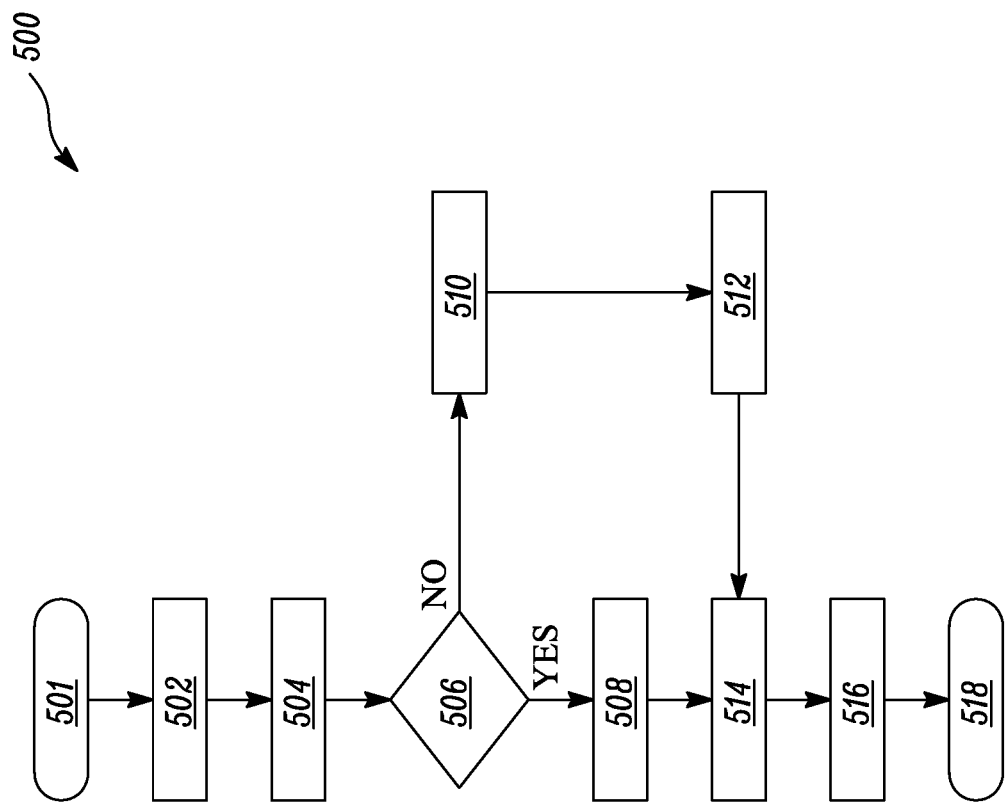
FIG. 5 illustrates a flow chart for a process to display at least one critical message in the remote sensing system of FIG. 3A, according to an embodiment of the present disclosure.

FIG. 5 illustrates a flowchart for a process 500 to display the at least one critical message 302 (shown in FIG. 3A) according to an embodiment of the present disclosure. The process 500 is embodied as a logic/algorithm implemented by the processor 204 and may be stored in a memory of the remote sensing system 200 illustrated in FIG. 3A.

At a block 501, the process 500 starts or begins operation. At a block 502, the processor 204 is configured to determine a first bandwidth "B1" of the second network 14. In general, bandwidth of a network is defined as maximum amount of data transmitted over the network in a given amount of time. In other words, bandwidth of a network is defined as maximum rate of data transfer over the network. Thus, the first bandwidth "B1" of the second network represents the maximum rate of data transfer over the second network 14. The process 500 then moves to a block 504. At the block 504, the processor 204 is further configured to determine a second bandwidth "B2" required to transmit the at least one signal to the display panel 114 via the second network 14.

The process 500 further moves to a block 506. At the block 506, the processor 204 determines if the second bandwidth "B2" of the second network 14 is less than or equal to the first bandwidth "B1" of the second network 14, i.e., "B2"≤ "B1". If "B2"≤ "B1", the process 500 then moves to a block 508. At the block 508, the processor determines the at least one critical message 302 (shown in FIG. 3A) corresponding to the at least one signal. However, in some instances, the processor 204 moves to a block 510 if the second bandwidth "B2" of the second network 14 is greater than the first bandwidth "B1" of the second network 14, i.e., "B2">"B". At the block 510, the processor 204 is configured to process the at least one signal to generate at least one processed signal if the second bandwidth "B2" is greater than the first bandwidth "B1". In some embodiments, the at least one signal is processed to generate the at least one processed signal, such that a third bandwidth "B3" required to transmit the at least one processed signal is less than the first bandwidth "B". In an example, the at least one signal needs to be processed to the at least one processed signal, such that an information pertaining to the at least one signal can be analyzed, displayed, or be utilized. Once the at least one processed signal is generated from the at least one signal, the process 500 moves from the block 510 to a block 512.

At the block 512, the processor 204 is further configured to determine the at least one critical message 302 (shown in FIG. 3A) corresponding to the at least one processed signal. Once the at least one critical message 302 is determined by the processor 204, the process moves to a block 514, either from the block 508 or from the block 512. At the block 514, the processor 204 is further configured to transmit the at least one critical message 302 to the display panel 114 via the second network 14. In some embodiments, at the block 514, the processor 204 is configured to transmit the at least one critical message 302A to each of the respective display panels 114A-114N (shown in FIG. 3B) via the second network 14.

The process 500 further moves to a block 516. At the block 516, the processor 204 is configured to display the at least one critical message 302 via the display panel 114. In some embodiments, at the block 516, the processor 204 is configured to display the at least one critical message 302 via each of the respective display panels 114A-114N (shown in FIG. 3B).

From the block 516, the process 500 moves to a block 518 where the process 500 ends or terminates operation.

Figure 6B:
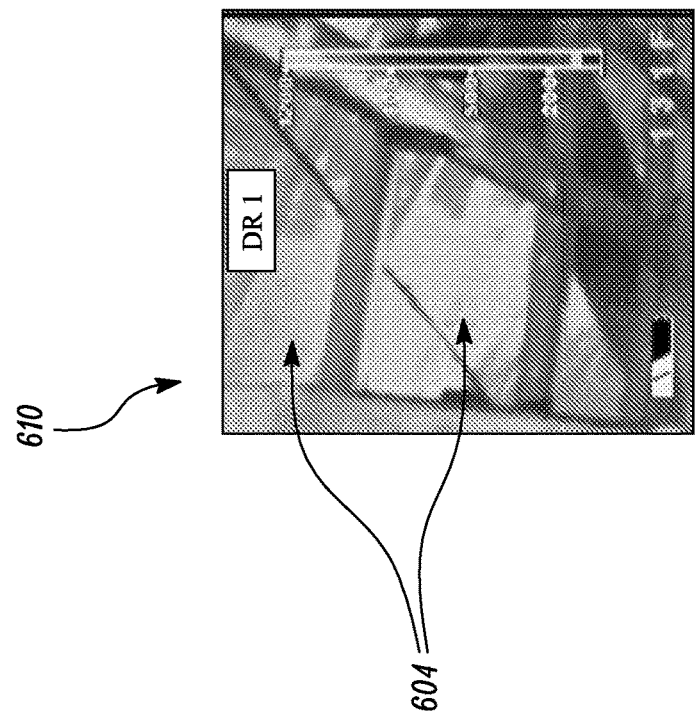
FIG. 6B illustrates an exemplary processed signal generated from the exemplary signal of FIG. 6A.
Figure 6A:
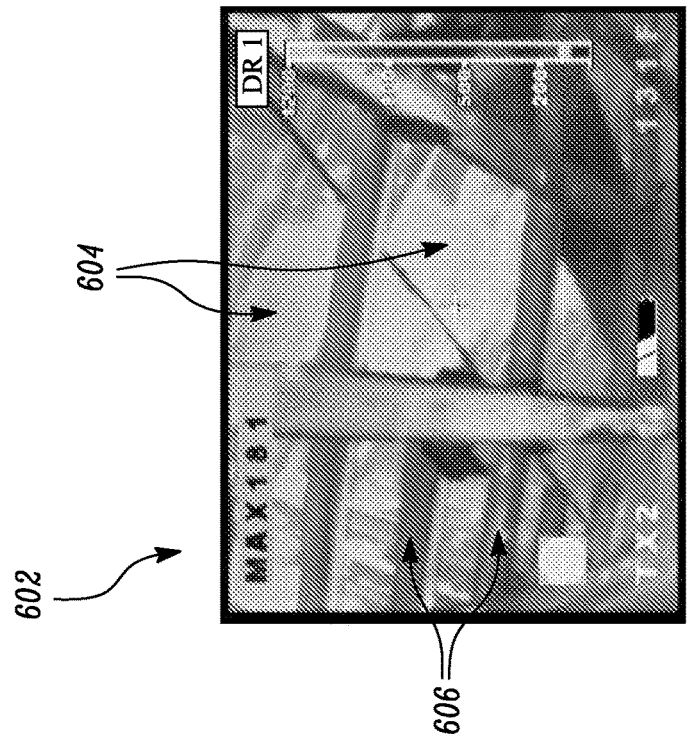
FIG. 6A illustrates an exemplary signal in the remote sensing system.

FIG. 6A illustrates an exemplary signal 602 selected by the processor 204 and received from a sensor from the plurality of sensors 202A-202N. The sensor 202A-202N in this example is a drone camera "DR1" (i.e., drone #1) generating the exemplary signal 602. In some examples, the exemplary signal 602 can also include an identifier of a source of the exemplary signal 602, for example, an alphanumeric code (e.g., a respective serial number) and/or a symbol. The exemplary signal 602 can be interchangeably referred to herein as "at least one signal 602". The at least one signal 602 is an image of a building or a structure that is subjected to fire, and the image is yet to be transmitted to a firefighter's display panel as a critical message to support the firefighter to prevent the spread of and extinguish significant unwanted fires. The at least one signal 602 includes some bright portions 604 and some dark portions 606. The bright portions 604 depict areas of the building which are under fire or hot spots, and the dark portions 606 depict areas of the building which are free from fire.

In some cases, a bandwidth (i.e., second bandwidth "B2") required to transmit the at least one signal 602 to the display panel 114 via the second network 14 is greater than a bandwidth (i.e., first bandwidth "B1") of the second network 14. In such cases, the at least one signal 602 is processed to generate at least one processed signal, such that a bandwidth (i.e., third bandwidth "B3") required to transmit the at least one processed signal is less than the bandwidth (i.e., first bandwidth "B1") of the second network 14.

FIG. 6B illustrates an exemplary processed signal 610 generated from the at least one signal 602 shown in FIG. 6A. The exemplary processed signal 610 can be interchangeably referred to herein as "at least one processed signal 610". As the dark portions 606 are of relatively less importance than that of the bright portions 604, the processor 204 can remove the dark portions 606 of the at least one signal 602 and generate the at least one processed signal 610. In other words, the processor 204 can reduce a size of the at least one signal 602 by removing the portions (i.e., the dark portions 606) that are of less importance to a firefighter. The at least one processed signal 610 shows the bright portions 604 and does not show the dark portions 606 of the at least one signal 602. Therefore, the at least one processed signal 610 includes at least a portion (i.e., the bright portions 604) of the at least one signal 602.

Figure 7:
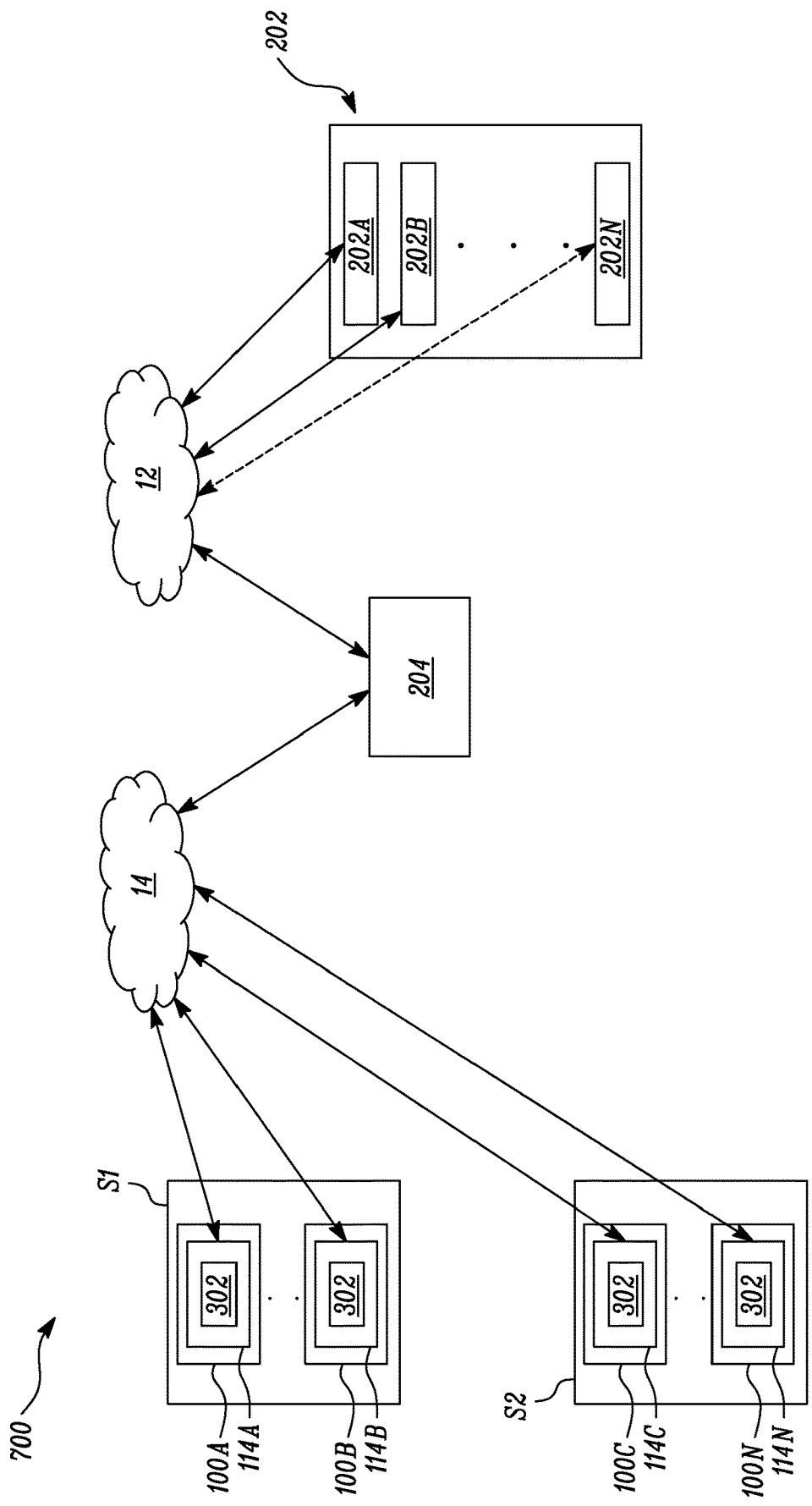
FIG. 7 is a detailed schematic block diagram of the remote sensing system of FIG. 3B, according to another embodiment of the present disclosure.

FIG. 7 illustrates a detailed schematic block diagram of a remote sensing system 700, in accordance with an embodiment of the present disclosure. The remote sensing system 700 is substantially similar to the remote sensing system 300 illustrated in FIG. 3B. Common components between the remote sensing system 700 and the remote sensing system 300 illustrated in FIG. 3B are illustrated by the same reference numerals. However, for the purpose of clarity, the respective controllers 205A-205N, and the respective wearers 10A-10N of the plurality of articles of PPE 100A-100N are not shown in the remote sensing system 700.

Further, the remote sensing system 700 includes a first set "S1" of the plurality of articles of PPE 100A-100N and a second set "S2" of the plurality of articles of PPE 100A-100N. Each of the first and second sets "S1", "S2" of the plurality of articles of PPE 100A-100N includes one or more respective display panels 114A-114N. In the illustrated embodiment, the first set "S1" includes the articles of PPE 100A and 100B. The second set "S2" includes the articles of PPE 100C to 100N. However, each of the first and second sets "S1", "S2" may include one or more articles of PPE 100. In other words, each of the first and second sets "S1", "S2" of the plurality of articles of PPE 100A-100N includes at least one article of PPE 100.

In some embodiments, the processor 204 is further configured to transmit the at least one critical message 302 from the one or more respective display panels 114A-114N of the first set "S1" of the plurality of articles of PPE 100A-100N to the one or more respective display panels 114A-114N of the second set "S2" of the plurality of articles of PPE 100A-100N. Specifically, the processor transmits the at least one critical message 302 from the one or more respective display panels 114A-114B of the first set "S1" including the articles of PPE 100A-100B to the one or more respective display panels 114C-114N of the second set "S2" including the articles of PPE 100C-100N via the second network 14.

In an example, the processor 204 can transmit a critical message 302 from the display panel 20) 114A of the article of PPE 100A of the first set "S1" to the display panel 114N of the article of PPE 100N of the second set "S2". In an example, the processor 204 can transmit a critical message 302 from the display panel 114N of the article of PPE 100N of the second set "S2" to the display panel 114A of the article of PPE 100A of the first set "S1".

Figure 8:
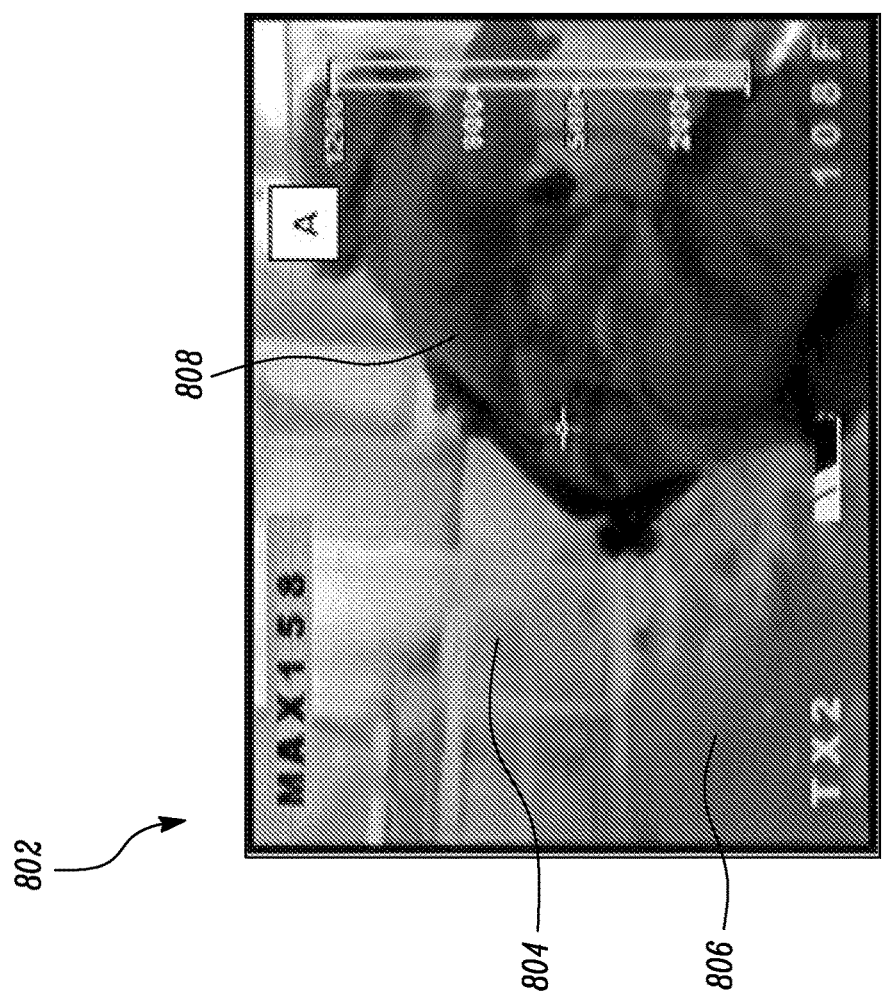
FIG. 8 illustrates an exemplary critical message in the remote sensing system.
Figure 9:
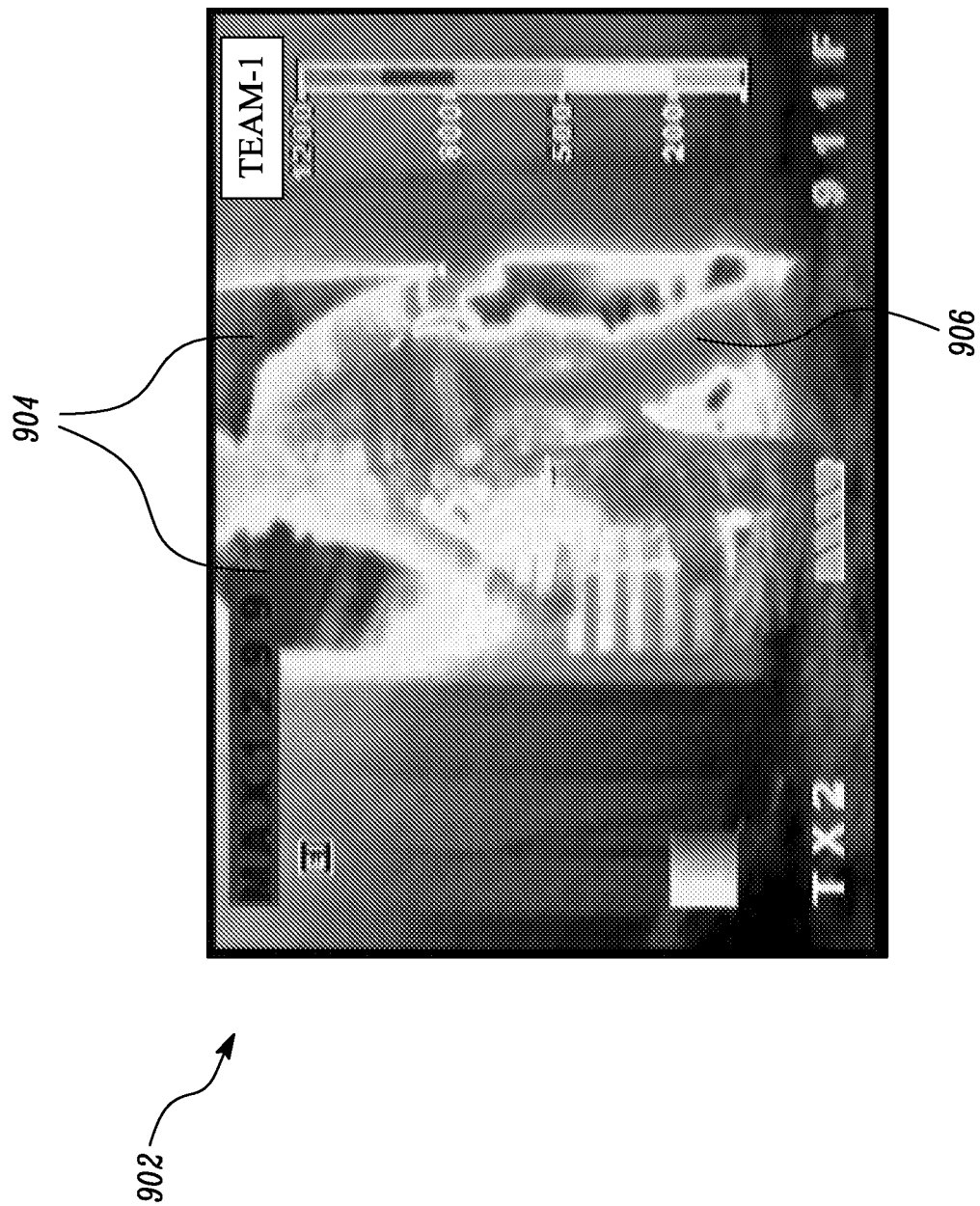
FIG. 9 illustrates another exemplary critical message in the remote sensing system.

FIG. 8 illustrates an exemplary critical message 802 determined by the processor 204 and displayed via the display panel 114 (shown in FIG. 3A) of the article of PPE 100, or via the respective display panels 114A-114N (shown in FIG. 3B) of the plurality of articles of PPE 100A-100N. The exemplary critical message 802 is determined from a signal received by a sensor from the plurality of sensors 202. The sensor in this example is a camera which is monitoring a building 804 from "A" side of a street 806. The sensor (camera) is disposed remotely from the article of PPE 100. In an example, during firefighting operations, such a critical message (i.e., the critical message 802) gives the wearer 10 an indication of an orientation of the sensor (camera) monitoring a particular area (i.e., the building 804) which may be on fire, or which may of some other interest to the wearer 10. The exemplary critical message 802 also shows that a first responder or a firefighter 808 is approaching way towards the building 804. Further, the exemplary critical message 802 may therefore also provide a location of the firefighter 808 relative to the building 804. Therefore, in some embodiments, the at least one critical message (i.e., the exemplary critical message 802) includes an information indicative of an orientation of one or more sensors 202A-220N (i.e., a camera) from the plurality of sensors 202 disposed remotely from the article of PPE 100. In some embodiments, the at least one critical message (i.e., the exemplary critical message 802) includes an information indicative of an orientation of one or more sensors 202A-202N (i.e., a camera) from the plurality of sensors 202 disposed remotely from the plurality of articles of PPE 100A-100N. FIG. 9 illustrates an exemplary critical message 902 determined by the processor 204 and displayed via the display panel 114 (shown in FIG. 3A) of the article of PPE 100, or via the respective display panels 114A-114N (shown in FIG. 3B) of the plurality of articles of PPE 100A-100N. The exemplary critical message 902 is determined from a signal received by a sensor from the plurality of sensors 202. The sensor in this example is a thermal imaging camera mounted on one of the wearers belonging to "TEAM-1" of an undergoing operation. The exemplary critical message 902 is a heat image captured by the thermal imaging camera. The exemplary critical message 902 illustrates another wearer 906 of "TEAM-1" and high temperature (>1000° F.) regions 904. The exemplary critical message 902 may show proximity of the wearer 906 to the high temperature regions 904.

A heat image corresponding to a wearer of "TEAM-1" is transmitted by the processor 204 as a critical message to the display panel 114 of the article of PPE 100. Therefore, in some embodiments, the at least one critical message (i.e., the exemplary critical message 902) includes an information indicative of an identifier of one or more sensors 202A-202N (i.e., a thermal imaging camera) from the plurality of sensors 202 disposed remotely from the article of PPE 100. In some cases, a heat image corresponding to a wearer of "TEAM-1" is transmitted by the processor 204 as a critical message to the respective display panels 114A-114N of the plurality of articles of PPE 100A-100N. Therefore, in some embodiments, the at least one critical message (i.e., the exemplary critical message 902) includes an information indicative of an identifier of one or more sensors 202A-

202N (i.e., a thermal imaging camera) from the plurality of sensors 202 disposed remotely from the plurality of articles of PPE 100A-100N.

In some embodiments, the at least one critical message 302 includes an information indicative of a distance between the article of PPE 100 (shown in FIG. 2A) and one or more sensors 202A-202N from the plurality of sensors 202. In some embodiments, the at least one critical message 302 includes an information indicative of a distance between the respective article of PPE 100A-100N (shown in FIG. 2B) and one or more sensors 202A-202N from the plurality of sensors 202. In an example, during firefighting operations, the at least critical message 302 in the form of digital data or audio-visual data may indicate a distance between the article of PPE 100 and a thermal imaging camera, or a distance between the article of PPE 100 and a gas detector, or a distance between the article of PPE 100 and a heat flux measurement gauge.

Further, in some cases, the processor 204 generates respective similar critical messages 302 generated from the respective signals corresponding to two or more sensors 202A-202N from the plurality of sensors 202. In such cases, while displaying the respective similar critical messages 302 via the display panel 114, each similar critical message also depicts a serial number or notation of the respective sensor 202A-202N from the plurality of sensors 202.

In some embodiments, the at least one critical message 302 may include an information about location of the sensor 202A-202N, generating the at least one signal corresponding to the at least one critical message 302, relative to the display panel 114.

Figure 10:
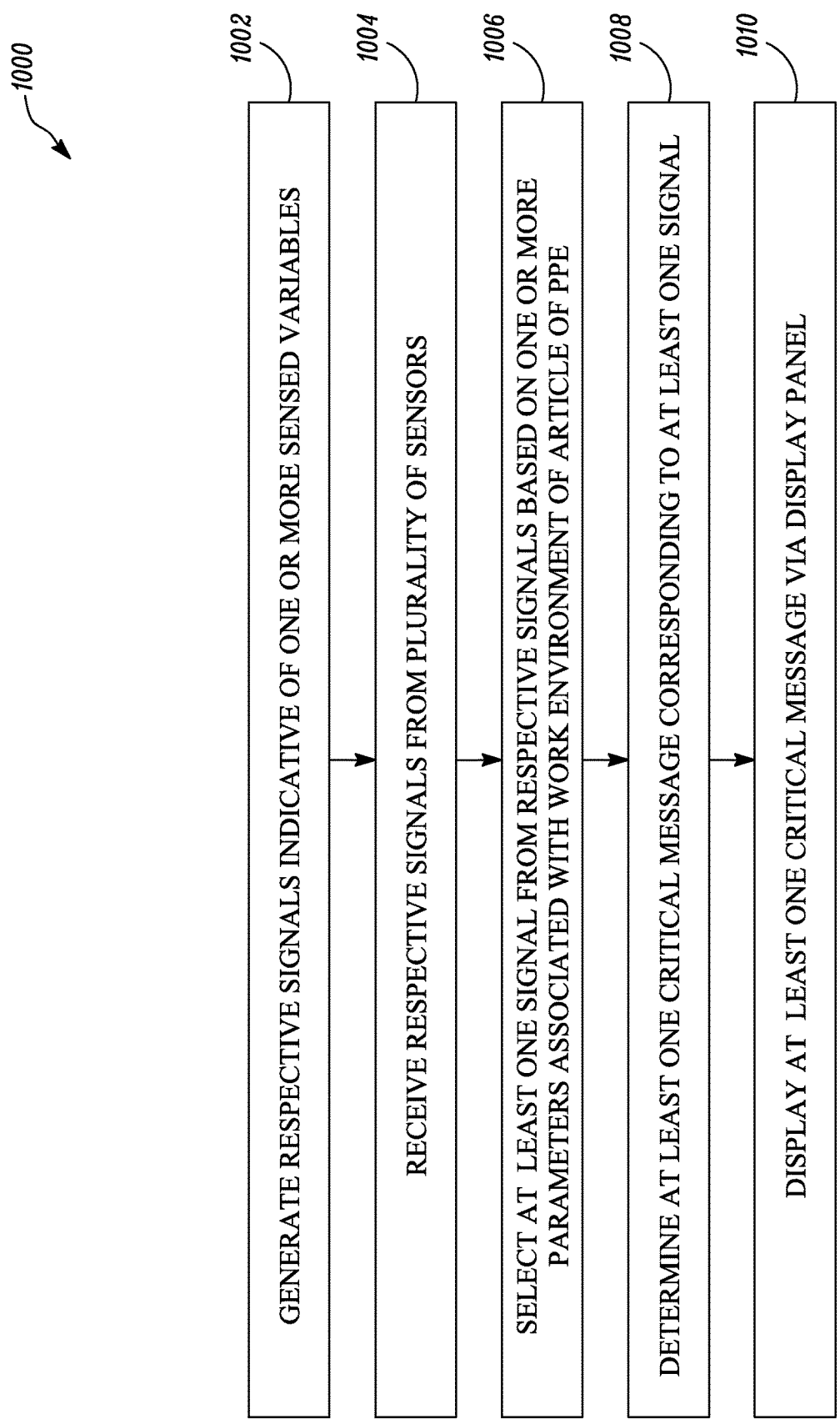
FIG. 10 is a flowchart for a method for use with a display panel of the article of PPE of the remote sensing system.

Referring to FIG. 10, a flowchart for a method 1000 for use with the display panel 114 of the article of PPE 100 of the remote sensing systems 200 of FIGS. 2A, 3A and 4A is illustrated. The display panel 114 is configured to be viewed by the wearer 10 of the article of PPE 100. At step 1002, the method 1000 includes generating, by the plurality of sensors 202 disposed remotely from the article of PPE 100, the respective signals indicative of one or more sensed variables. The sensed variables may include one or more of temperature levels, pressure levels, concentration of harmful gases/chemicals/hazardous substances, wind speed, wind direction, a compass, on-scene time, a distance between the article of PPE 100 and a sensor 202A-202N from the plurality of sensors 202, etc.

At step 1004, the method 1000 includes receiving, by the processor 204 communicably coupled to the plurality of sensors 202 and the display panel 114 of the article of PPE 100, the respective signals from the plurality of sensors 202. At step 1006, the method 1000 includes selecting, by the processor 204, the at least one signal from the respective signals based on one or more parameters associated with the work environment of the article of PPE 100. At step 1008, the method 1000 includes determining, by the processor 204, the at least one critical message 302 corresponding to the at least one signal. At step 1010, the method 1000 includes displaying the at least one critical message 302 via the display panel 114.

The method 1000 further includes receiving, by the processor 204, the respective signals from the plurality of sensors 202 via the first network 12 between the processor 204 and the plurality of sensors 202. The method 1000 further includes transmitting, by the processor 204, the at least one critical message 302 to the display panel 114 via the second network 14 between the processor 204 and the display panel 114 of the article of PPE 100.

The method 1000 further includes selecting, by the processor 204, the plurality of signals from the respective signals based on respective one or more parameters, wherein the plurality of signals corresponds to a set of sensors from the plurality of sensors 202. The method 1000 further includes determining, by the processor 204, the plurality of critical messages 302A-302N (shown in FIG. 4A) corresponding to the plurality of signals. Each critical message 302A-302N has a corresponding degree of criticality. The method 1000 further includes sequentially displaying, via the display panel 114, the plurality of critical messages 302A-302N based on the corresponding degrees of criticality.

The method 1000 further includes selecting, by the processor 204, the one or more signals from the plurality of signals based on an input from the wearer 10. In some embodiments, the input is provided with the help of the input button 16 (shown in FIG. 4A) provided on the article of PPE 100 and communicably coupled to the controller 205 in the article of PPE 100.

The method 1000 further includes selecting, from the respective signals, the at least two signals corresponding to the at least two sensors from the plurality of sensors 202 based on respective one or more parameters. The processor 204 is used to select the at least two signals. The method 1000 further includes determining, by the processor 204, a combined critical message based on the at least two signals. The method 1000 further includes displaying the combined critical message via the display panel 114. In some embodiments, the critical message 302A (shown in FIG. 4A) is a combined critical message. In some embodiments, the critical message 302N is a combined critical message.

Referring to FIGS. 5 and 10, the method 1000 further includes determining, by the processor 204, the first bandwidth "B1" of the second network 14. The method 1000 further includes determining, by the processor 204, the second bandwidth "B2" required to transmit the at least one signal to the display panel 114 via the second network 14. The method 1000 further includes processing, by the processor 204, the at least one signal to generate the at least one processed signal if the second bandwidth "B2" is greater than the first bandwidth "B1". The third bandwidth "B3" required to transmit the at least one processed signal is less than the first bandwidth "B1". The method 1000 further includes determining, by the processor 204, the at least one critical message 302 (shown in FIG. 3) corresponding to the processed signal. The method 1000 further includes transmitting, by the processor 204, the at least one critical message 302 to the display panel 114 via the second network 14. The method 1000 further includes displaying, by the processor 204, the at least one critical message 302 via the display panel 114.

Figure 11:
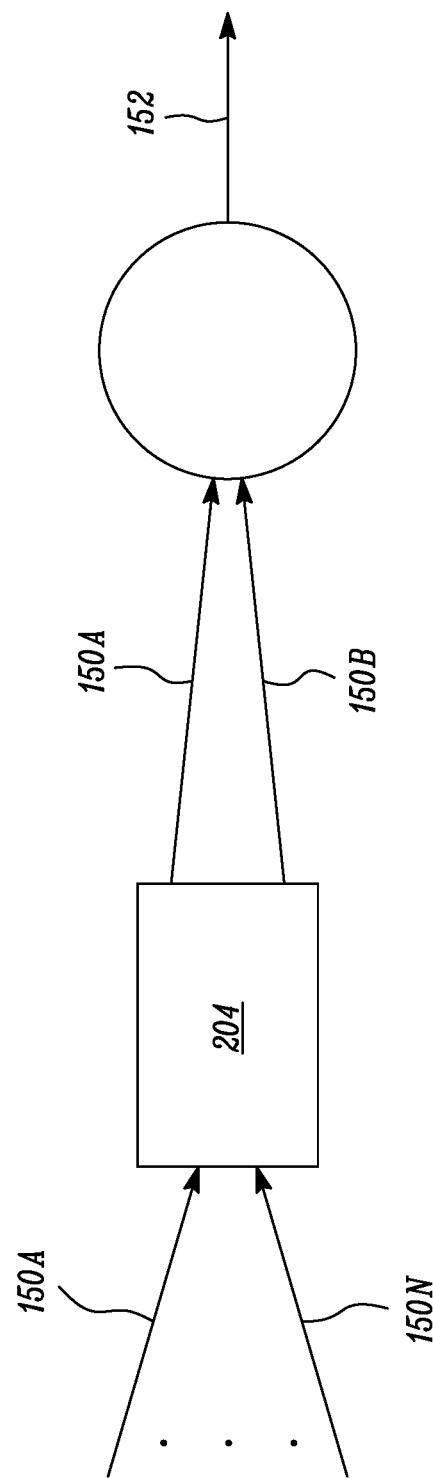
FIG. 11 illustrates a schematic block diagram of a processor of the remote sensing system performing an operation in accordance with an embodiment of the present disclosure.

FIG. 11 shows a schematic block diagram of the processor 204 performing an operation in accordance with an embodiment of the present disclosure. As shown in FIG. 11, the processor 204 receives a plurality of signals 150A-150N (collectively referred to as "signals 150"). Each of the signals 150A-150N may be generated by the respective sensors 202A-202N from the plurality of sensors 202. The processor 204 selects at least two signals 150A, 150B from the plurality of signals 150. The signals 150A, 150B may correspond to the respective sensors 202A, 202B. The processor 204 further determines a combined critical message 152 based on the at least two signals 150A, 150B.

Unless otherwise indicated, all numbers expressing feature sizes, amounts, and physical properties used in the specification and claims are to be understood as being modified by the term "about". Accordingly, unless indicated to the contrary, the numerical parameters set forth in the foregoing specification and attached claims are approximations that can vary depending upon the desired properties sought to be obtained by those skilled in the art utilizing the teachings disclosed herein.

Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

The invention claimed is:

1. A remote sensing system comprising:
   an article of personal protective equipment (PPE) comprising a display panel configured to be viewed by a wearer of the article of PPE;
   a plurality of sensors disposed remotely from the article of PPE, wherein each of the sensors is configured to generate a respective signal indicative of one or more sensed variables; and
   a processor communicably coupled to the plurality of sensors and the display panel of the article of PPE, wherein the processor is configured to:
      receive the respective signals from the plurality of sensors;
      select at least one signal from the respective signals based on one or more parameters associated with a work environment of the article of PPE;
      determine at least one critical message corresponding to the at least one signal; and
      display the at least one critical message via the display panel.

2. The remote sensing system of claim 1, wherein the one or more parameters comprise one or more of a temperature level, a concentration of at least one hazardous substance, a wind speed, a wind direction, a compass, on-scene time, a distance between at least one safety device and the article of PPE, and a location of at least one of the plurality of sensors with respect to the article of PPE.

3. The remote sensing system of claim 1, wherein the at least one signal comprises a plurality of signals corresponding to a set of sensors from the plurality of sensors, wherein the processor is further configured to:
   select the plurality of signals from the respective signals based on respective one or more parameters;
   determine a plurality of critical messages corresponding to the plurality of signals, wherein each critical message has a corresponding degree of criticality; and
   sequentially display the plurality of critical messages via the display panel based on the corresponding degrees of criticality.

4. The remote sensing system of claim 3, wherein the processor is further configured to select one or more signals from the plurality of signals based on an input from the wearer.

5. The remote sensing system of claim 1, wherein the processor is further configured to:
   select, from the respective signals, at least two signals corresponding to at least two sensors from the plurality of sensors based on respective one or more parameters;
   determine a combined critical message based on the at least two signals; and
   display the combined critical message via the display panel.

6. The remote sensing system of claim 1, wherein the processor is configured to:
   receive the respective signals from the plurality of sensors via a first network between the processor and the plurality of sensors; and
   transmit the at least one critical message to the display panel via a second network between the processor and the display panel of the article of PPE.

7. The remote sensing system of claim 6, wherein the processor is further configured to:
   determine a first bandwidth of the second network;
   determine a second bandwidth required to transmit the at least one signal to the display panel via the second network;
   process the at least one signal to generate at least one processed signal if the second bandwidth is greater than the first bandwidth, wherein a third bandwidth required to transmit the at least one processed signal is less than the first bandwidth;
   determine the at least one critical message corresponding to the processed signal;
   transmit the at least one critical message to the display panel via the second network; and
   display the at least one critical message via the display panel.

8. The remote sensing system of claim 7, wherein the at least one critical message comprises one or more of an audio-visual signal, a still image, a pictograph, a symbol, digital data, a slow-motion video, a live video feed, and an indication and a location of the sensor generating the at least one signal corresponding to the at least one critical message.

9. The remote sensing system of claim 7, wherein the at least one processed signal comprises at least a portion of the at least one signal.

10. The remote sensing system of claim 7, wherein the at least one critical message comprises an information indicative of a distance between the article of PPE and one or more sensors from the plurality of sensors.

11. The remote sensing system of claim 7, wherein the at least one critical message comprises an information indicative of an orientation of one or more sensors from the plurality of sensors disposed remotely from the article of PPE.

12. The remote sensing system of claim 7, wherein the at least one critical message comprises an information indicative of an identifier of one or more sensors from the plurality of sensors disposed remotely from the article of PPE.

13. A remote sensing system comprising:
   a plurality of articles of personal protective equipment (PPE), each of the plurality of articles of PPE comprising a respective display panel configured to be viewed by a respective wearer of the respective article of PPE;
   a plurality of sensors disposed remotely from the plurality of articles of PPE, wherein each of the sensors is configured to generate a respective signal indicative of one or more sensed variables; and
   a processor communicably coupled to the plurality of sensors and the respective display panels of the plurality of articles of PPE, wherein the processor is configured to:
      receive the respective signals from the plurality of sensors;

select at least one signal from the respective signals based on one or more parameters associated with a work environment of the plurality of articles of PPE;

determine at least one critical message corresponding to the at least one signal; and display the at least one critical message via each of the respective display panels.

14. The remote sensing system of claim 13, wherein the one or more parameters comprise one or more of a temperature level, a concentration of at least one hazardous substance, a wind speed, a wind direction, a compass, on-scene time, a distance between at least one safety device and each of the plurality of articles of PPE, and a location of at least one of the plurality of sensors with respect to each of the plurality of articles of PPE.

15. The remote sensing system of claim 13, wherein the at least one signal comprises a plurality of signals corresponding to a set of sensors from the plurality of sensors, wherein the processor is further configured to:

select the plurality of signals from the respective signals based on respective one or more parameters;

determine a plurality of critical messages corresponding to the plurality of signals, wherein each critical message has a corresponding degree of criticality; and sequentially display the plurality of critical messages via each of the respective display panels based on the corresponding degrees of criticality.

16. The remote sensing system of claim 15, wherein the processor is further configured to select one or more signals from the plurality of signals based on respective inputs from the respective wearers.

17. The remote sensing system of claim 13, wherein the processor is further configured to:

select, from the respective signals, at least two signals corresponding to at least two sensors from the plurality of sensors based on respective one or more parameters;

determine a combined critical message based on the at least two signals; and display the combined critical message via each of the respective display panels.

18. The remote sensing system of claim 13, wherein the processor is configured to:

receive the respective signals from the plurality of sensors via a first network between the processor and the plurality of sensors; and transmit the at least one critical message to each of the respective display panels via a second network between the processor and the respective display panels of the plurality of articles of PPE.

19. The remote sensing system of claim 18, wherein the processor is further configured to:

determine a first bandwidth of the second network;

determine a second bandwidth required to transmit the at least one signal to the respective display panels via the second network;

process the at least one signal to generate at least one processed signal if the second bandwidth is greater than the first bandwidth, wherein a third bandwidth required to transmit the at least one processed signal is less than the first bandwidth;

determine the at least one critical message corresponding to the processed signal;

transmit the at least one critical message to each of the respective display panels via the second network; and display the at least one critical message via each of the respective display panels.

* * * * *